US007353404B2

(12) United States Patent
Hashimoto et al.

(10) Patent No.: US 7,353,404 B2
(45) Date of Patent: Apr. 1, 2008

(54) TAMPER RESISTANT MICROPROCESSOR

(75) Inventors: Mikio Hashimoto, Chiba (JP); Keiichi Teramoto, Tokyo (JP); Takeshi Saito, Tokyo (JP); Kenji Shirakawa, Kanagawa (JP); Kensaku Fujimoto, Kanagawa (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 362 days.

(21) Appl. No.: 11/071,327

(22) Filed: Mar. 4, 2005

(65) Prior Publication Data

US 2005/0166069 A1 Jul. 28, 2005

Related U.S. Application Data

(62) Division of application No. 09/781,158, filed on Feb. 13, 2001, now Pat. No. 6,983,374.

(30) Foreign Application Priority Data

Feb. 14, 2000 (JP) ............................ P2000-35898
May 8, 2000 (JP) ........................... P2000-135010

(51) Int. Cl.
*G06F 21/00* (2006.01)
(52) U.S. Cl. ...................................................... 713/194
(58) Field of Classification Search ................ 713/193, 713/194
See application file for complete search history.

(56) References Cited

U.S. PATENT DOCUMENTS 4,558,176 A * 12/1985 Arnold et al. .............. 713/190
4,634,807 A * 1/1987 Chorley et al. ............... 705/55
4,757,533 A * 7/1988 Allen et al. ................. 713/192
4,847,902 A 7/1989 Hampson
5,123,045 A 6/1992 Ostrovsky et al.
5,224,166 A 6/1993 Hartman, Jr.
5,548,645 A 8/1996 Ananda
5,666,411 A 9/1997 McCarty
5,805,706 A 9/1998 Davis (Continued)

FOREIGN PATENT DOCUMENTS

EP 0 583 140 2/1964

(Continued)

OTHER PUBLICATIONS

"The TrustNo 1 Cryptoprocessor Concept"□□Markus Kuhn□□ Apr. 30, 1997.*

(Continued)

*Primary Examiner*—Kambiz Zand
*Assistant Examiner*—Andrew L Nalven
(74) *Attorney, Agent, or Firm*—Oblon, Spivak, McClelland, Maier & Neustadt, P.C.

(57) ABSTRACT

Under a multi-task environment, a tamper resistant microprocessor saves a context information for one program whose execution is to be interrupted, where the context information contains information indicating an execution state of that one program and the execution code encryption key of that one program. An execution of that one program can be restarted by recovering the execution state of that one program from the saved context information. The context information can be encrypted by using the public key of the microprocessor, and then decrypted by using the secret key of the microprocessor.

16 Claims, 15 Drawing Sheets

U.S. PATENT DOCUMENTS

| | | | | |
|---|---|---|---|---|
| 5,825,878 | A | 10/1998 | Takahashi et al. | |
| 5,894,516 | A | 4/1999 | Brandenburg | |
| 6,003,117 | A | 12/1999 | Buer et al. | |
| 6,006,328 | A * | 12/1999 | Drake | 713/200 |
| 6,385,727 | B1 * | 5/2002 | Cassagnol et al. | 713/193 |
| 6,651,171 | B1 * | 11/2003 | England et al. | 713/193 |

FOREIGN PATENT DOCUMENTS

| | | |
|---|---|---|
| GB | 2 330 932 | 5/1999 |
| JP | 05-020197 | 1/1993 |
| JP | 06-112937 | 4/1994 |
| JP | 08-305558 | 11/1996 |
| JP | 2980576 | 9/1999 |
| JP | 11-282667 | 10/1999 |
| JP | 2002-140236 | 5/2002 |
| JP | 2002-526822 | 8/2002 |

OTHER PUBLICATIONS

Bruce Schneier, Applied Cryptography, Second Edition, 1996.*

Markus Kuhn, “The Trust No. 1 Cryptoprocessor Concept,” CS555 Report, Purdue University, Apr. 30, 1997, pp. 1-6.

Tanguy Gilmont, et al., “Enhancing Security In The Memory Management Unit”, Proceedings of 25th Euromicro Conference, Sep. 1999, pp. 1-8.

Tanguy Gilmont, et al., “An Architecture of Security Management Unit for Safe Hosting of Multiple Agents”, Microelectrics Laboratory, Université Catholique de Louvain, pp. 1-12.

Larry W.. Allen, et al., Usenix, pp. 145-160, “Program Loading In OSF/1”, 1991.

David Aucsmith, et al., Proceedings of the 1996 Intel Software Developers’ Conference, pp. 1-10, “Tamper Resistant Software: An Implementation”, 1996.

Bruce Schneier, Applied Cryptography, Second Edition, 1996.

* cited by examiner

FIG.7A

| | 0 | 1 | 2 | 3 |
|---|---|---|---|---|
| 0 | A0 | A1 | A2 | A3 |
| 1 | B0 | B1 | B2 | B3 |
| 2 | C0 | C1 | C2 | C3 |
| 3 | D0 | D1 | D2 | D3 |
| 4 | E0 | E1 | E2 | E3 |
| 5 | F0 | F1 | F2 | F3 |
| 6 | G0 | G1 | G2 | G3 |
| 7 | H0 | H1 | H2 | H3 |

BEFORE INTERLEAVING

FIG.7B

| | | | | |
|---|---|---|---|---|
| 0 | A0 | B0 | C0 | D0 |
| 1 | E0 | F0 | G0 | H0 |
| 2 | A1 | B1 | C1 | D1 |
| 3 | E1 | F1 | G1 | H1 |
| 4 | A2 | B2 | C2 | D2 |
| 5 | E2 | F2 | G2 | H2 |
| 6 | A3 | B3 | C3 | D3 |
| 7 | E3 | F3 | G3 | H3 |

AFTER INTERLEAVING

| 31 | 15 | 0 | |
|---|---|---|---|
| I/O MAP BASE ADDRESS | | T | 100 |
| | LDR SEGMENT SELECTOR | | 96 |
| | | GS | 92 |
| | | FS | 88 |
| | | DS | 84 |
| | | SS | 80 |
| | | CS | 76 |
| | | ES | 72 |
| EDI | | | 68 |
| ESI | | | 64 |
| EBP | | | 60 |
| ESP | | | 56 |
| EBX | | | 52 |
| EDX | | | 48 |
| ECX | | | 44 |
| EAX | | | 40 |
| EFLAGS | | | 36 |
| EIP | | | 32 |
| CR3(PDBR) | | | 28 |
| | | SS2 | 24 |
| ESP2 | | | 20 |
| | | SS1 | 16 |
| ESP1 | | | 12 |
| | | SS0 | 8 |
| ESP0 | | | 4 |
| | LINK TO PREVIOUS TASK | | 0 |

TAMPER RESISTANT MICROPROCESSOR

CROSS-REFERENCE TO RELATED APPLICATIONS

This application is a divisional application of U.S. application Ser. No. 09/781,158, filed Feb. 13, 2001 now U.S. Pat. No. 6,983,374, and claims the benefit of priority to Japanese Patent Applications No. 2000-35898, filed Feb. 14, 2000, and No. 2000-135010, filed May 8, 2000, the entire contents each of which are incorporated herein by reference.

BACKGROUND OF THE INVENTION

1. Field of the Invention

The present invention relates to a microprocessor that can prevent illegal alternation of execution codes and processing target data under a multi-task program execution environment.

2. Description of the Background Art

In recent years, the performance of a microprocessor has improved considerably such that the microprocessor is capable of realizing reproduction and editing of video images and audio sounds, in addition to the conventional functions such as computations and graphics. By implementing such a microprocessor in a system designed for end-user (which will be referred to as PC hereafter), the users can enjoy various video images and audio sounds on monitors. Also, by combing the function for reproducing video images and audio sounds with the computational power of the PC, the applicability to games or the like can be improved. Such a microprocessor is not designed for any specific hardware and can be implemented in a variety of hardwares so that there is an advantage that the users who already possess PCs can enjoy reproduction and editing of video images and audio sounds inexpensively by simply changing a microprocessor for executing programs.

In the case of handling video images and audio sounds on PCs, there arises a problem of a protection of the copyright of original images or music. In the MD or digital video playback devices, unlimited copies can be prevented by implementing a mechanism for preventing the illegal copying in these devices in advance. It is rather rare to attempt the illegal copying by disassembling and altering these devices, and even if such devices are made, there is a worldwide trend for prohibiting the manufacturing and sales of devices altered for the purpose of illegal copying by laws. Consequently, damages due to the hardware based illegal copying are not very serious.

However, image data and music data are actually processed on the PC by the software rather than the hardware, and the end-user can freely alter the software on the PC. Namely, if the user has some level of knowledge, it is quite feasible to carry out the illegal copying by analyzing programs and rewriting the executable software. In addition, there is a problem that the software for illegal copying so produced can be spread very quickly through media such as networks, unlike the hardware.

In order to resolve these problems, conventionally a PC software to be used for reproducing copyright protected contents such as commercial films or music has employed a technique for preventing analysis and alternation by encrypting the software. This technique is known as a tamper resistant software (see David Aucsmith et al., "Tamper Resistant Software: An Implementation", Proceedings of the 1996 Intel Software Developer's Conference).

The tamper resistant software technique is also effective in preventing illegal copying of valuable information including not only video and audio data but also text and know-how that is to be provided to a user through the PC, and protecting know-how contained in the PC software itself from analysis.

However, the tamper resistant software technique is a technique which makes analysis using tools such as deassembler or debugger difficult by encrypting a portion of the program that requires protection before the execution of the program starts, decrypting that portion immediately before executing that portion and encrypting that portion again immediately after the execution of that portion is completed. Consequently, as along as the program is executable by a processor, it is always possible to analyze the program by carrying out the analysis step by step starting from the start of the program.

This fact has been an obstacle for a copyright owner to provide copyright protected contents to a system for reproducing video and audio data using the PC.

The other tamper resistant software applications are also vulnerable in this regard, and this fact has been an obstacle to a sophisticated information server through the PC and an application of a program containing know-how of an enterprise or individual to the PC.

These are problems that equally apply to the software protection in general, but in addition, the PC is an open platform so that there is also a problem of an attack by altering the operating system (OS) which is intended to be a basis of the system's software configuration. Namely, a skilled and malicious user can alter the OS of his own PC to invalidate or analyze the copyright protection mechanisms incorporated in application programs by utilizing privileges given to the OS.

The current OS realizes the management of resources under the control of the computer and the arbitration of their uses by utilizing a privileged operation function with respect to a memory and an execution control function provided in CPU. Targets of the management include the conventional targets such as devices, CPU and memory resources, as well as QoS (Quality of Service) at network or application level. Nevertheless, the basics of the resource management are still allocations of resources necessary for the execution of a program. Namely, an allocation of a CPU time to the execution of that program and an allocation of a memory space necessary for the execution are the besics of the resource management. The control of the other devices, network and application QoS is realized by controlling the execution of a program that makes accesses to these resources (by allocating a CPU time and a memory space).

The OS has privileges for carrying out the CPU time allocation and the memory space allocation. Namely, the OS has a privilege for interrupting and restarting an application program at arbitrary timing and a privilege to move a content of a memory space allocated to an application program to a memory of a different hierarchical level at arbitrary timing, in order to carry out the CPU time allocation. The latter privilege is also used for the purpose of providing a flat memory space to the application by concealing (normally) hierarchical memory systems with different access speeds and capacities from the application.

Using these two privileges, the OS can interrupt an execution state of the application and take a snap shot of it at arbitrary timing, and restart it after making a copy of it or rewriting it. This function can also be used as a tool for analyzing secrets hidden in the application.

In order to prevent an analysis of the application on a computer, there are several known techniques for encrypting programs or data (Hampson, U.S. Pat. No. 4,847,902; Hartman, U.S. Pat. No. 5,224,166; Davis, U.S. Pat. No. 5,806,706; Takahashi et al., U.S. Pat. No. 5,825,878; Buer et al., U.S. Pat. No. 6,003,117; Japanese Patent Application Laid Open No. 11-282667 (1999), for example). However, these known techniques do not account for the protection of the program operation and the data secrecy from the above described privileged operations of the OS.

The conventional technique based on the x86 architecture of Intel Corporation (Hartman, U.S. Pat. No. 5,224,166) is a technique for storing the execution codes and data by encrypting them by using a prescribed encryption key Kx. The encryption key Kx is given in a form of $E_{Kp}$[Kx] which is encrypted by using a public key Kp corresponding to a secret key Ks embedded in a processor. Consequently, only the processor that knows Ks can decrypt the encrypted execution codes on a memory. The encryption key Kx is stored in a register inside the processor called a segment register.

Using this mechanism, it is possible to protect the secrecy of the program codes from the user to some extent by encrypting the codes. Also, it becomes cryptographically difficult for a person who does not know the encryption key Kx of the codes to alter the codes according to his intention or newly produce codes that are executable when decrypted by using the encryption key Kx.

However, the system employing this technique has a drawback in that the analysis of the program becomes possible by utilizing a privilege of the OS called a context switching, without decrypting the encrypted execution codes.

More specifically, when the execution of the program is stopped by the interruption or when the program voluntarily calls up a software interruption command due to the system call up, the OS carries out the context switching for the purpose of the execution of the other program. The context switching is an operation to store an execution state (which will be referred to as a context information hereafter) of the program indicating a set of register values at that point into a memory, and restoring the context information of another program stored in the memory in advance into the registers.

FIG. 15 shows the conventional context storing format used in the x86 processor. All the contents of the registers used by the application are contained here. The context information of the interrupted program is restored into the registers when the program is restarted. The context switching is an indispensable function in order to operate a plurality of programs in parallel. In the conventional technique, the OS can read the register values at a time of the context switching, so that it is possible to guess most of the operations made by the programs if not all, according to how the execution state of that program has changed.

In addition, by controlling a timing at which the exception occurs by setting of a timer or the like, it is possible to carry out this processing at arbitrary execution point of the program. Apart from the interruption of the execution and the analysis, it is also possible to rewrite the register information by malicious intention. The rewriting of the registers can not only change the operation of the program but also make the program analysis easier. The OS can store arbitrary state of the application so that it is possible to analyze the operation of the program by rewriting the register values and operating the program repeatedly. In addition to the above described functions, the processor has a debugging support function such as a stepwise execution, and there has been a problem that the OS can analyze the application by utilizing all these functions.

As far as data are concerned, U.S. Pat. No. 5,224,166 asserts that the program can access the encrypted data only by the program execution using the encrypted code segment. Here, there is a problem that the encrypted data can be freely read by the encrypted program by using arbitrary key, regardless of the encryption key by which the program is encrypted, even when there are programs encrypted by using mutually different encryption keys. This conventional technique does not account for the case where the OS and the application have their own secrets independently and the secret of the application is to be protected from the OS or a plurality of program providers have their own secrets separately.

Of course, it is possible to separate memory spaces among the applications and to prohibit accesses to a system memory by the applications by the protection function provided in the virtual memory mechanism even in the existing processor. However, as long as the virtual memory mechanism is under the management of the OS, the protection of the secret of the application cannot rely on the function under the management of the OS. This is because the OS can access data by ignoring the protection mechanism, and this privilege is indispensable in providing the virtual memory function as described above.

As another conventional technique, Japanese Patent Application Laid Open No. 11-282667 (1999) discloses a technique of a secret memory provided inside the CPU in order to store the secret information of the application. In this technique, a prescribed reference value is required in order to access data in the secret memory. However, this reference fails to disclose how to protect the reference value for obtaining the access right with respect to the secret data from a plurality of programs operating in the same CPU, especially the OS.

Also, in U.S. Pat. No. 5,123,045, Ostrovsky et al. disclose a system that presupposes the use of sub-processors having unique secret keys corresponding to the applications, in which the operation of the program cannot be guessed from the access pattern by which these sub-processors are accessing programs placed on a main memory. This is based on a mechanism for carrying out random memory accesses by converting the instruction system for carrying out operations with respect to the memory into another instruction system different from that.

However, this technique requires different sub-processors for different applications so that it requires a high cost, and the implementation and fast realization of the compiler and processor hardware for processing such instruction system are expected to be very difficult as they are quite different from those of the currently used processors. Besides that, in this type of processor, it becomes difficult to comprehend correspondences among the data contents and the operations even when the data and the operations of the actually operated codes are observed and traced so that the debugging of the program becomes very difficult, and therefore this technique has many practical problems, compared with the other conventional techniques described above in which the program codes and the data are simply encrypted, such as those of U.S. Pat. No. 5,224,166 and Japanese Patent Application Laid Open No. 11-282667.

SUMMARY OF THE INVENTION

Therefore the first object of the present invention is to provide a microprocessor capable of surely protecting both the internally executed algorithm and the data state inside a memory region from illegal analysis in the multi-task environment even when the execution is stopped by the interruption.

This first object is motivated by the fact that the conventional techniques are capable of protecting values of the program codes but are incapable of preventing the analysis utilizing the interruption of the program execution by the exception occurrence or the debugging function. Thus the present invention aims at providing a microprocessor capable of surely protecting the codes even at a time of the program execution interruption, in which this protection is compatible with both the execution control function and the memory management function required by the current OS.

The second object of the present invention is to provide a microprocessor in which each program can secure a correctly readable/writable data region independently even when a plurality of programs encrypted by using different encryption keys are to be executed.

This second object is motivated by the fact that the conventional technique of U.S. Pat. No. 5,224,166 only provides a simple protection in which accesses to the encrypted data region by non-encrypted codes are prohibited, and it has been impossible for a plurality of programs to protect their own secrets independently. Thus the present invention also aims at providing a microprocessor which has a data region for protecting secret of each application from the OS when a plurality of applications have their respective (encrypted) secrets.

The third object of the present invention is to provide a microprocessor capable of protecting the protected attributes (i.e., encrypted attributed) of the above described data region from illegal rewriting by the OS.

This third object is motivated by the fact that the conventional technique of U.S. Pat. No. 5,224,166 has a drawback in that the OS can rewrite the encrypted attributes set in the segment register by interrupting the execution of the program using the context switching. Once the program is put in a state where data are written in a form of plaintext by rewriting the encrypted attributes, data will not written into a memory without encryption. Even if the application checks the segment register value at some timing, the result is the same if the register value is rewritten after that. Thus the present invention also aims at providing a microprocessor provided with a mechanism which is capable of prohibiting such an alteration or detecting such an alteration and taking appropriate measure against such an alteration.

The fourth object of the present invention is to provide a microprocessor capable of protecting the encrypted attributes from the so called chosen-plaintext attack of the cryptoanalysis theory, in which the program can use arbitrary value as the data encryption key.

The fifth object of the present invention is to provide a microprocessor provided with a mechanism for the program debugging and feedback. Namely, the present invention aims at providing a microprocessor in which the debugging of the program is carried out in plaintext and the feedback of information on defects is provided to a program code provider (program vendor) in the case of the execution failure.

The sixth object of the present invention is to provide a microprocessor capable of achieving the first to fifth objects described above in a form that realizes both a low cost and a high performance.

In order to achieve the first object, the first aspect of the present invention has the following features. The microprocessor which is formed as a single chip or a single package reads a plurality of programs encrypted by using code encryption keys that are different for different programs, from a memory (a main memory, for example) external of the microprocessor through a bus interface unit that provides a reading function. A decryption unit decrypts these plurality of read out programs by using respectively corresponding decryption keys, and an instruction execution unit executes these plurality of decrypted programs.

In the case of interrupting the execution of some program among the plurality of programs, a context information encryption/decryption unit that provides an execution state writing function encrypts information indicating a state of execution up to an interrupted point of the program to be interrupted and the code encryption key of this program, by using an encryption key unique to the microprocessor, and writes the encrypted information as a context information into a memory external of the microprocessor.

In the case of restarting the interrupted program, a verification unit that provides a restarting function decrypts the encrypted context information by using a unique decryption key corresponding to the unique encryption key of the microprocessor, and restarts the execution of the program only when the code encryption key contained in the decrypted context information (that is the code encryption key of the program scheduled to be restarted) coincides with the original code encryption key of the interrupted program.

In addition, in order to achieve the second and third objects, the microprocessor also has a memory region (a register, for example) inside the processor that cannot be read out to the external, and an encrypted attribute writing unit (an instruction TLB, for example) for writing encrypted attributes for the processing target data of the program into the internal memory. The encrypted attributes include the code encryption key of the program and an encryption target address range, for example). At least a part of these encrypted attributes is contained in the context information.

The context information encryption/decryption unit also attaches a signature based on a secret information unique to the microprocessor to the context information. In this case, the verification unit judges whether the signature contained in the decrypted context information coincides with the original signature based on the secret information unique to the microprocessor or not, and restarts the interrupted program only when they coincide.

In this way, the state of execution up to an interrupted point of the encrypted program is stored in the external memory as the context information, while the protected attributes of the execution processing target data are stored in the register inside the processor, so that the illegal alteration of the data can be prevented.

In order to achieve the fourth object, the second aspect of the present invention has the following features. The microprocessor that is formed as a single chip or a single package maintains a unique secret key therein that cannot be read out to the external. The bus interface unit that provides a reading function reads the code encryption key that is encrypted by using a unique public key of the microprocessor corresponding to the secret key in advance from a memory external of the microprocessor. A key decryption unit that provides a first decryption function decrypts the read out code encryption key by using the secret key of the microprocessor. The bus interface unit also reads out a plurality of programs encrypted by respectively different code encryption keys from an external memory. A code decryption unit that provides a second decryption function decrypts these plurality of read out programs. The instruction execution unit executes these plurality of decrypted programs.

In the case of interrupting the execution of some program among the plurality of programs, a random number generation mechanism generates a random number as a temporary key. The context information encryption/decryption unit writes a first value obtained by encrypting information indicating the execution state of the program to be interrupted by using the random number, a second value obtained by encrypting this random number by using the code encryption key of the program to be interrupted, and a third value obtained by encrypting this random number by using the secret key of the microprocessor, into the external memory as the context information.

In the case of restarting the execution of the program, the context information encryption/decryption unit reads out the context information from the external memory, decrypts the random number of the third value contained in the context information by using the secret key, and decrypts the execution state information contained in the context information by using the decrypted random number. At the same time, the random number of the second value contained in the context information is decrypted by using the code encryption key of the program scheduled to be restarted. The random number obtained by decrypting the second value by using the code encryption key and the random number obtained by decrypting the third value by using the secret key are compared with the temporary key, and the execution of the program is restarted only when they coincide.

In this way, the context information indicating the state of execution up to an interrupted point is encrypted by using the random number that is generated at each occasion of the storing, and the signature using the secret key unique to the microprocessor is attached, so that the context information can be stored in the external memory safely.

In order to achieve the first to third and sixth objects, the third aspect of the present invention has the following features. The microprocessor that is formed as a single chip or a single package reads out a plurality of programs encrypted by using the encryption keys that are different for different programs, and executes them. This microprocessor has an internal memory (a register, for example) that cannot be read out to the external, and stores the encrypted attributes for data to be referred from each program (that is the processing target data) and the encrypted attribute specifying information into the register. The context information encryption/decryption unit writes a related information that is related to the encrypted attribute specifying information stored in the register and containing a signature unique to the microprocessor, into the external memory. A protection table management unit reads the related information from the external memory according to an address of the data to be referred by the program. The verification unit verifies the signature contained in the read out related information by using the secret key, and permits the data referring by the program according to the encrypted attribute specifying information and the read out related information only when that signature coincides with the signature unique to the microprocessor.

In this configuration, the information to be stored in the internal register is attached with the signature and stored into the external memory, and only the necessary portion is read out to the microprocessor. The signature is verified at a time of reading, so that the safety against the substitution can be secured. Even when the number of programs to be handled is increased and the number of the encrypted attributes is increased, there is no need to expand the memory region inside the microprocessor so that a cost can be reduced.

According to one aspect of the present invention there is provided a microprocessor having a unique secret key and a unique public key corresponding to the unique secret key that cannot be read out to external, comprising: a reading unit configured to read out a plurality of programs encrypted by using different execution code encryption keys from an external memory; a decryption unit configured to decrypt the plurality of programs read out by the reading unit by using respective decryption keys; an execution unit configured to execute the plurality of programs decrypted by the decryption unit; a context information saving unit configured to save a context information for one program whose execution is to be interrupted, into the external memory or a context information memory provided inside the microprocesor, the context information containing information indicating an execution state of the one program and the execution code encryption key of the one program; and a restart unit configured to restart an execution of the one program by reading out the context information from the external memory or the context information memory, and recovering the execution state of the one program from the context information.

Other features and advantages of the present invention will become apparent from the following description taken in conjunction with the accompanying drawings.

BRIEF DESCRIPTION OF THE DRAWINGS

FIGS. 7A and 7B are diagrams respectively showing exemplary data before and after interleaving used in the microprocessor of FIG. 3.

DETAILED DESCRIPTION OF THE PREFERRED EMBODIMENTS

Figure 1:
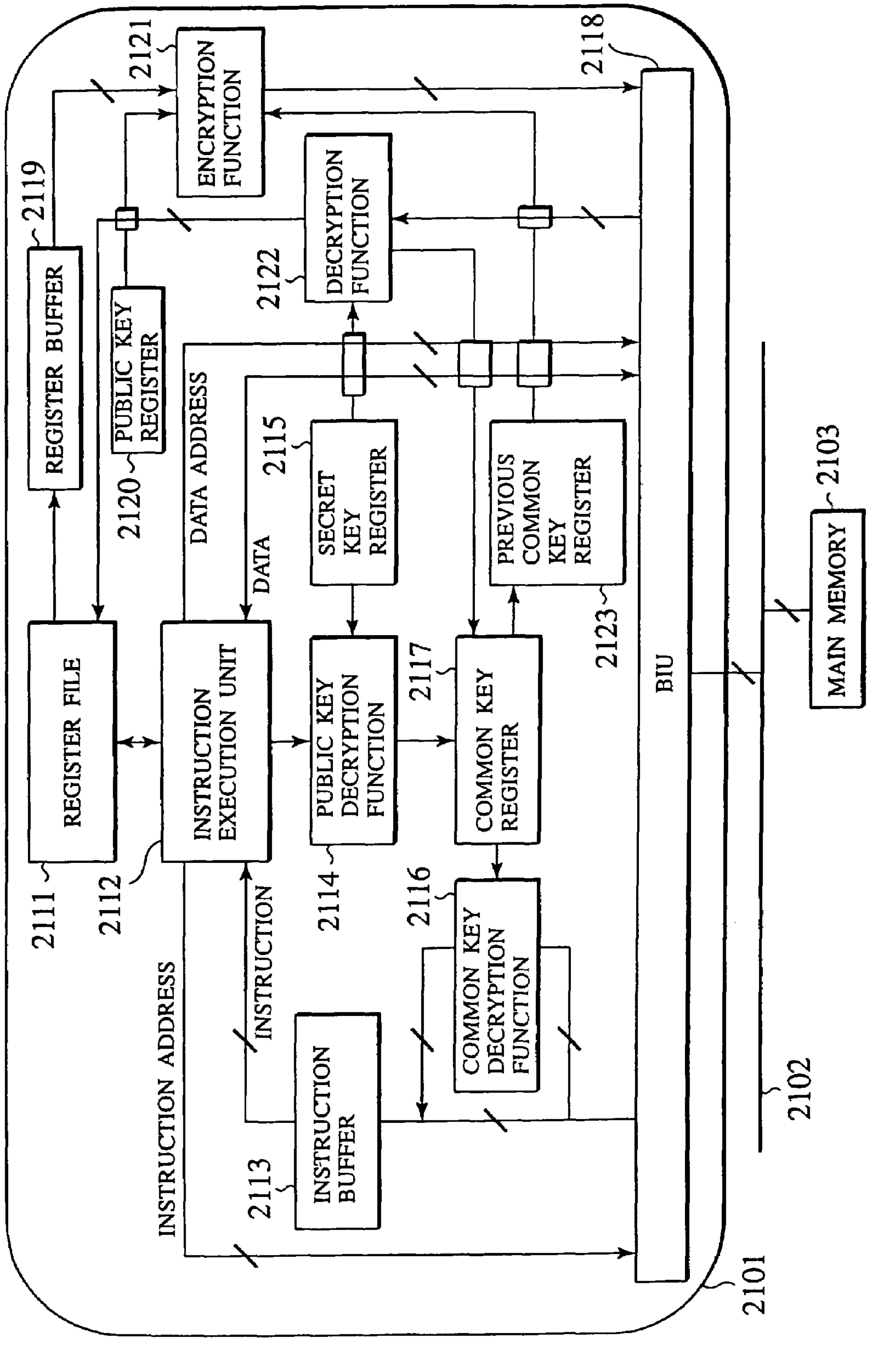
FIG. 1 is a block diagram showing a system incorporating a microprocessor according to the first embodiment of the present invention.
Figure 2:
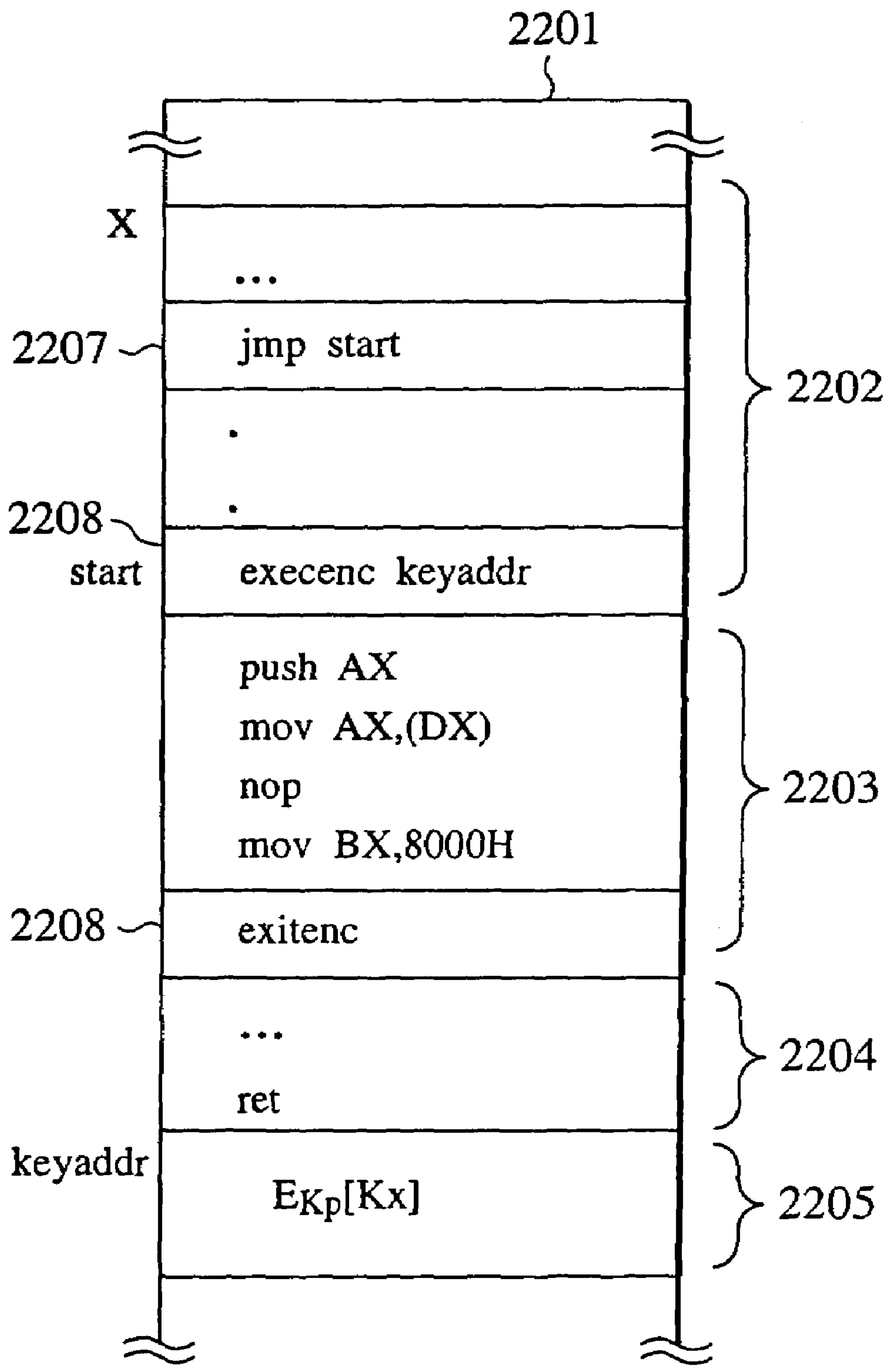
FIG. 2 is a diagram showing an entire memory space used in the microprocessor of FIG. 1.

Referring now to FIG. 1 and FIG. 2, the first embodiment of a tamper resistant microprocessor according to the present invention will be described in detail.

This first embodiment is directed to a microprocessor for protecting secrets of the program instructions (execution codes) and the context information (execution state) which are to be provided in encrypted forms by using the public key (asymmetric key) cryptosystem, from a user of a target system.

FIG. 1 shows the target system, where a microprocessor 2101 of the target system is connected to a main memory 2103 through a bus 2102.

As shown in FIG. 1, in this embodiment, the microprocessor 2101 has a register file 2111, an instruction execution unit 2112, an instruction buffer 2113, a public key descryption function 2114, a secret key register 2115, a common key decryption function 2116, a common key register 2117, a BIU (Bus Interface Unit) 2118, a register buffer 2119, a public key register 2120, an encryption function 2121, a decryption function 2122, and a previous common key register 2123, which will be described in further detail below.

First, the terms to be used in the following description will be described, and the operation of general operating system (OS) and application programs will be described briefly. A program is a set of data and a series of machine language instructions written for some specific purpose. The OS is a program for managing resources of the system, and the application is a program to be operated under the resource management of the OS. This embodiment presupposes the multi-task system, so that a plurality of application programs will be operated in a quasi parallel manner under the management of the OS. Each one of these programs that are operated in the quasi parallel manner will be referred to as a process. There are cases where a set of processes for executing the processes for the same purpose will be referred to as a task.

The instructions and data of the application program are usually stored in files on a secondary memory. They are arranged on a memory by a loader of the OS and executed as a process. The execution of the program is often interrupted by an exception (or interruption) processing of the processor caused by input/output or the like. A program for carrying out the exception processing will be referred to as an exception handler, The exception handler is usually set up by the OS. The OS can process an exception request from the hardware, interrupt the operation of the application and restart or start the operation of another application at arbitrary timing. The interruptions of the process include transitory cases where the execution of the original process is restarted without switching processes after the execution of the exception handler, and cases requiring the process switching. Examples of the former include a simple timer increment and examples of the latter include a virtual memory processing due to the page exception.

The object of this embodiment is to protect the program instructions (execution codes) and the execution state from a user of the target system who can freely read the main memory of the target system and freely alter the OS program or application programs.

The basic features for achieving this object are the access control with respect to the information storage inside the processor and the encryption based on the information listed below.

(1) A common key Kx selected by a program creator, The application program will be encrypted by the secret key cryptosystem using this key.

(2) A pair of a unique public key Kp and a unique secret key Ks provided inside the processor. The public key can be read out by the program by using instructions.

(3) An encryption key information in which the common key Kx of the program is encrypted by using the public key Kp of the processor.

[Execution of a Plaintext Program]

This processor is capable of executing a program with coexisting plaintext instructions and encrypted instructions which is placed on the main memory. Here the operation inside the CPU for the execution of a plaintext program will be described with references to FIG. 1 and a memory arrangement shown in FIG. 2.

FIG. 2 shows an entire memory space 2201, in which programs are placed in regions 2202 to 2204 on the main memory, where regions 2202 and 2204 are plaintext regions while a region 2203 is an encrypted region. A region 2205 stores a key information to be used in decrypting the region 2203.

The execution of the program is started as the control is shifted from the OS by an instruction for jump to a top X of the program or the like. The instruction execution unit 2112 executes the instruction for jump to X, and outputs an address of the instruction to the BIU 2118, The content of the address X is read through the bus 2102, sent from the BIU 2118 to the instruction buffer 2113, and sent to the instruction execution unit 2112 where the instruction is executed. Its operation result is reflected in the register file 2111. When the operation target is reading/writing with respect to an address on the main memory 2103, its address value is sent to the BIU 2118, that address is outputted from the BIU 2118 to the bus 2102, and data reading/writing with respect to the memory is carried out.

The instruction buffer 2113 has a capacity for storing two or more instructions, and the instructions corresponding to a size of the instruction buffer 2113 are collectively read out from the main memory 2103.

[Execution of Encrypted Instructions]

Next, the case of executing an encrypted instruction will be described. The processor of this embodiment has two states including the execution of plaintext instructions and the execution of encrypted instructions, and two types of instructions for controlling these states are provided. One is an encryption execution start instruction for making a transition from the execution of plaintext instructions to the execution of encrypted instructions, and another is a plaintext return instruction for making a reverse transition.

[Encryption Execution Start Instruction]

The encryption execution start instruction is denoted by the following mnemonic "execenc" and takes one operand:

execenc keyaddr where "keyaddr" indicates an address where the key information to be used in decrypting the subsequent instructions is stored.

[Key Information]

Here, the key information and the program encryption will be described. The encrypted region 2203 comprises a sequence of encrypted instructions. The instructions are subdivided into blocks in units of a prefetch queue size and encrypted by the secret key algorithm such as DES (Data Encryption Standard) algorithm. A key to be used in this encryption will be denoted as Kx hereafter. Since the secret key algorithm is used, the same key Kx is also used for the decryption.

If this Kx is placed on the main memory in a plaintext form, a user who can operates the OS of the target system can easily read it and analyze the encrypted program. In order to prevent this, $E_{Kp}$[Kx] obtained by encrypting Kx by using the public key Kp of the processor will be placed in the region 2205 of the memory. A top address of this region is indicated by "keyaddr".

It is cryptographically (computationally) impossible to decrypt Kx from $E_{Kp}$[Kx] unless one knows Ks corresponding to the public key Kp. Consequently, the secret of the program will never be leaked to the user as long as the user of the target system does not know Ks. This Ks is stored in a form that cannot be read out from the external, inside the processor. The processor can decrypt Kx internally without allowing the user to learn about it, and the processor can also decrypt the encrypted program by using Kx and execute it.

In the following, the encryption execution start instruction and the subsequent the execution of the encrypted instruction will be described in detail. By the execution of the jump instruction in a region 2207, the control is shifted to the encryption execution start instruction at the address "start". At the address indicated by the operand "keyaddr" of the encryption execution start instruction, the content of the specified region 2205 is read out to the instruction execution unit 2112 of the processor as data. The instruction execution unit 2112 sends this data $E_{Kp}$[Kx] to the public key decryption function 2114. The public key decryption function 2114 takes out Kx by decrypting $E_{Kp}$[Kx] by using a secret key Ks unique to the processor which is stored in the secret key register 2115, and stores it in the common key register 2117. Then, the processor enters the encrypted instruction execution state.

Here, it is assumed that the processor package is manufactured such that the contents stored in the secret key register 2115 and the common key register 2117 cannot be read out to the external by the program or the debugger of the processor chip.

By executing the encryption execution start instruction, the key to be used in decrypting the subsequent instructions is stored into the common key register 2117, and the processor is entered into the encrypted instruction execution state. When the processor is in the encrypted instruction execution state, the instructions read from the main memory 2103 are sent from the BIU 2118 to a common key decryption function 2116, decrypted by using the key information stored in the common key register 2117 and stored into the instruction buffer 2113.

In this embodiment, the program encrypted by using the key Kx which is stored in the region 2204 next to the encryption execution start instruction will be decrypted, stored in the instruction buffer 2113, and executed. The reading is carried out in units of a size of the instruction buffer 2113. FIG. 2 shows an exemplary case where the size of the instruction buffer 2113 is 64 bits, and four instructions of 16 bits size each are collectively read out to the instruction buffer 2113.

[Plaintext Return Instruction]

The processor in the encrypted instruction execution state returns to the plaintext instruction execution state by the execution of the plaintext return instruction.

The plaintext return instruction is denoted by the following mnemonic:

exitenc which takes no operand. By execution of this instruction, the reading of the instructions from the main memory 2103 is carried out through a path that does not pass through the common key decryption function 2116, and the processor returns to the execution of the plaintext instructions.

Note that when the encryption execution start instruction is executed again during the execution of the encrypted instruction, the instruction decryption key is changed such that the subsequent instructions are decrypted by using a different key and executed.

[Context Saving and Attack Against It]

Next, the safe saving of the execution state in order to protect the secret of the application program in the multitask environment will be described.

The register file 2111 of this processor has 32 general purpose registers (R0 to R31). R31 is used as a program counter. The contents of the general purpose registers are stored in the register file 2111. When the exception occurs during the execution of the encrypted program as described above, the contents of the register file 2111 are moved to the register buffer 2119, and the contents of the register file 2111 are initialized by a prescribed value or a random number. Then, the value of the common key used for decryption of the encrypted program is stored in the previous common key register 2123. Only when these two types of initialization are completed, the control is shifted to the exception handler and the instructions of the exception handler are executed. The instructions of the exception handler are assumed to be non-encrypted.

By this register file initialization function, in the processor of this embodiment, the reading of the register values processed by the encrypted program by the exception handler program is prevented even in the case where the control is shifted to the exception handler as an exception occurs during the execution of the encrypted program. At the same time, the contents of the register file 2111 are saved in the register buffer 2119, and there is a function for recovering the register buffer contents and for storing them into the memory as will be described below, so as to enable the restart of the encrypted program.

Now, the register contents stored in the register buffer 2119 cannot be read out directly from the non-encrypted program of the exception handler. The non-encrypted program of the exception handler is only allowed to perform the following two operations with respect to the register buffer 2119.

(1) Recover the register buffer contents and restart the execution of the original encrypted program.

(2) Encrypting the register buffer contents and store them into the memory, and execute the OS program or another encrypted program.

In the case of (1), when the exception handler processing such as the increment of the counter is finished, the exception handler issued a "cont" (continue) instruction. When the "cont" instruction is executed, the contents of the register buffer 2119 and the previous common key register 2123 are recovered in the register file 2111 and the common key register 2117, respectively. The program counter is contained in the register file 2111, so that the execution of the encrypted program is restarted by setting the control back to a point where the execution of the encrypted program was interrupted. For the decryption of the encrypted program after the restart, the value recovered from the previous common key register 2123 will be used. Similarly as the contents of the register buffer 2119, the program cannot rewrite the previous common key register 2123 explicitly.

The case of (2) corresponds to the case where the process switching occurs at a timing of the execution of the exception handler. In this case, the exception handler or a task dispatcher of the processor issues a "savereg" (save register) instruction for saving the contents of the register buffer 2119 into the memory. This "savereg" instruction is denoted by the following mnemonic:

savereg dest and takes one operand "dest" indicating an address to which the register buffer contents are to be saved.

When the "savereg" instruction is issued, the contents of the register buffer 2119 and the previous common key register 2123 are encrypted by the encryption function 2121 by using the public key Kp of the processor stored in the public key register 2120, and saves at an address on the main memory 2103 specified by "dest" through the BIU 2118. The main memory 2103 is outside the processor so that it has a possibility of being accessed by the user, but these contents are encrypted by the public key of the processor so that the user who does not know the secret key of the processor cannot learn the register buffer contents.

After the register buffer contents are saved, the OS activates another encrypted program by the method described above. If another encrypted program is activated without saving the register buffer contents, the register buffer contents would be rewritten to those of another encrypted program when the execution of another encrypted program is interrupted, and it would become impossible to restart the original encrypted program as the register buffer contents for the original encrypted program are lost.

Here, the number of the register buffer is assumed to be one, but it is also possible to provide a plurality of register buffers so as to be able to deal with multiple exceptions.

[Recovery Procedure]

Next a procedure for recovering the saved execution state will be described.

At a time of restarting the interrupted application, a dispatcher of the OS issues a "rcvrreg" (recover register) instruction. This "rcvrreg" instruction is denoted by the following mnemonic:

rcvrreg addr and takes one operand "addr" indicating an address at which the execution state is saved.

When the "rcvrreg" instruction is issued, the encrypted execution state information is taken out from the address of the memory specified by "addr" by the BIU 2118 of the processor, decrypted by using the secret key Ks of the processor by the decryption function 2122, and the register information is recovered in the register file 2111 while the program decryption key is recovered in the common key register 2117. When the recovery is completed, the execution of the interrupted program is restarted from a point indicated by the program counter. At this point, the key Kx recovered from the execution state information will be used for decryption of the encrypted program.

The detail of the saving and the recovery of the execution state in relation to the interruption of the encrypted program due to exception has been described above. As already described above, the encrypted programs are safe against attacks from the user who can operate the OS of the target system.

Next, the safety of the above described scheme against two types of attacks against the execution state will be described.

[Attacks Against the Execution State]

There are two types of attacks against the execution state that is generated in a process of the application execution. One is the peeping of the saved execution state by an attacker, and the other is the rewriting of the execution state to a desired value by an attacker.

Here, the following two terms for expressing the illegal accesses to the execution state will be defined. First, the program that has generated the execution state will be referred to as an original program for that execution state. The original program can be restarted by recovering the execution state in the registers. On the other hand, programs other than the program that has generated the execution state, that is programs encrypted by encryption keys different from that of the original program or plaintext programs, will be referred to as other programs.

The illegal accesses or the attacks with respect to the execution state generated by some original program are defined as an act of directly analyzing the execution state on the memory by some method independently from the operation of the processor by a third party who does not know the encryption key of the original program, or an act of analyzing the execution state or rewriting the execution state to a desired value by a third party utilizing the other programs operated on the same processor.

In the microprocessor of this embodiment, the execution state is protected by the following three types of mechanisms so as to prevent the illegal accesses utilizing the access to the memory external of the processor or the other programs.

First, in this embodiment, the register information is saved in the register buffer 2119 when the execution of the encrypted program is interrupted. Then, the register buffer 2119 and the previous common key register 2123 cannot be accessed by any methods other than that using the "rcvrreg" instruction or the "savereg" instruction, so that the other programs cannot read their contents freely.

In the conventional processor, the register contents at a time of the exception occurrence can be freely read by the exception handler program. In the microprocessor of this embodiment, the register contents are saved in the register buffer 2119 so as to prohibit the reading from the other programs, and the instruction for saving the register buffer contents by encrypting them by using the public key of the processor is provided so as to prevent the peeping of the execution state saved on the memory by the user of the system.

The second attacking method includes a method for reading values of the registers contained in the execution state by placing the instruction of some other program known to the attacker at the same memory address as the original program such that this other program reads the encrypted execution state.

In the microprocessor of this embodiment, the encrypted execution state contains the program encryption key, and this key will be used in decrypting the encrypted program at a time of restart. Because of this mechanism, even when the other program other than the original program attempts to read the execution state, the key for does not match so that the program cannot be decrypted correctly and the program cannot be executed according to the intention of the attacker, Thus the second attacking method is impossible in the microprocessor of this embodiment.

This effect cannot be realized by simply encrypting the execution state itself by the public key of the processor, but can be realized by encrypting the decryption key of the original program and the execution state integrally.

Note that, in order to maximize this effect, values of the registers (R0 to R31) and the common key Kx should preferably be stored in the identical cipher block at a time of the encryption using the public key.

[Data Protection]

In the microprocessor of this embodiment, the encryption of the data is not accounted, but it should be apparent to those skilled in the art that it is possible to add the data encryption function to the microprocessor of this embodiment similarly as the data encryption in the microprocessor for supporting the virtual memory which will be described in the second embodiment.

Referring now to FIG. 3 to FIG. 14, the second embodiment of a tamper resistant microprocessor according to the present invention will be described in detail.

In this embodiment, the microprocessor according to the present invention will be described for an exemplary case of using an architecture based on the widely used Pentium Pro microprocessor of the Intel corporation, but the present invention is not limited to this particular architecture. In the following description, features specific to the Pentium Pro microprocessor architecture will be noted and applications to the other architectures will be mentioned.

Note that the Pentium Pro architecture distinguishes three types of addresses in the address space including physical addresses, linear addresses and logical addresses, but the linear addresses in the Pentium terminology will also be referred to as logical addresses in this embodiment.

In the following description, the protection implies the protection of secrets of applications (that is the protection by encryption), unless otherwise stated. Consequently, the protection in this embodiment should be clearly distinguished from the ordinarily used concept of protection, that is the prevention of disturbances on the operations of the other applications due to the operation of some application. However, in the present invention, it is assumed that the operation protection mechanism in the ordinary sense is of course provided by the OS (although the description of this aspect will be omitted as it is unrelated to the present invention), in parallel to the protection of secrets of applications according to the present invention.

Also, in the following description, a machine language instructions that are executable by the processor will be referred to as instructions, and a plurality of instructions will be collectively referred to as an execution code or an instruction stream. A key used in encrypting the instruction stream will be referred to as the execution code encryption key.

Also, in the following description, the secret protection mechanism will be described as protecting secrets of applications under the management of the OS, but this mechanism can also be utilized as a mechanism for protecting the OS itself from alteration or analysis.

Figure 3:
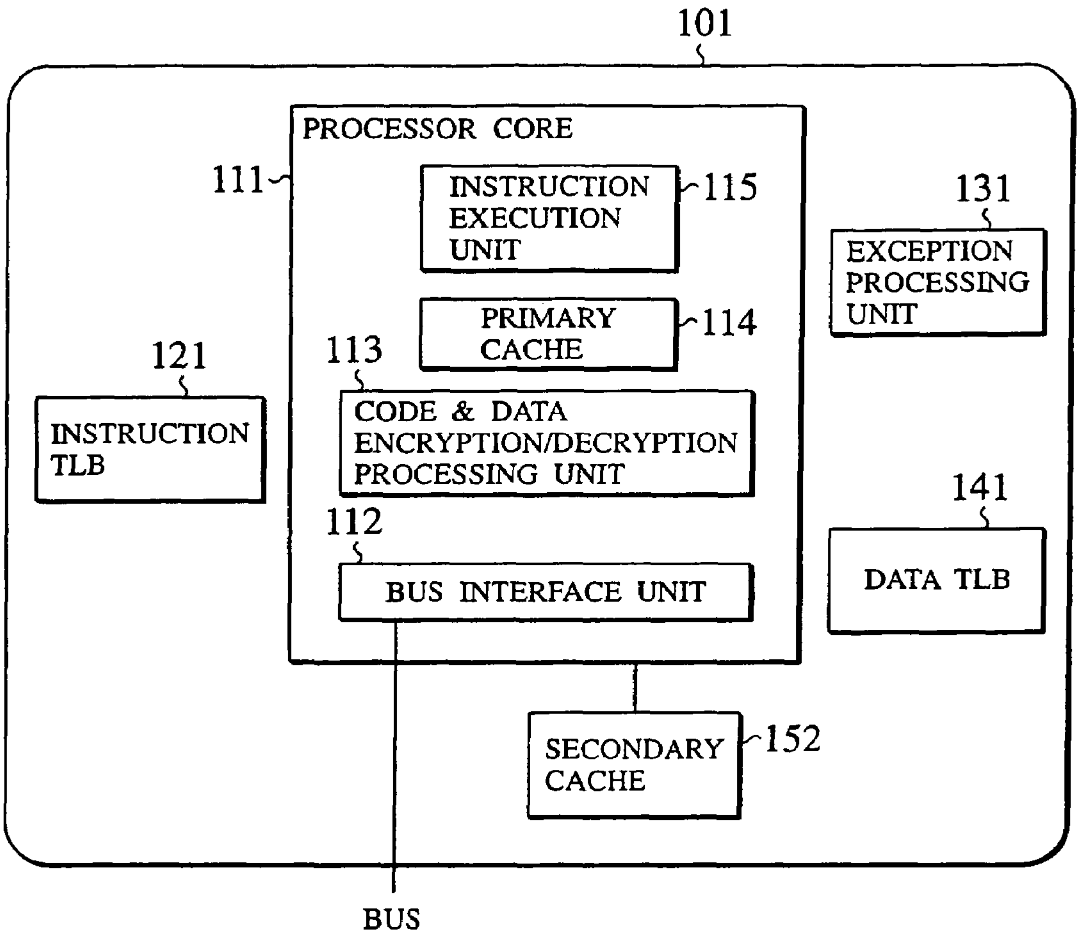
FIG. 3 is a block diagram showing a basic configuration of a microprocessor according to the second embodiment of the present invention.
Figure 4:
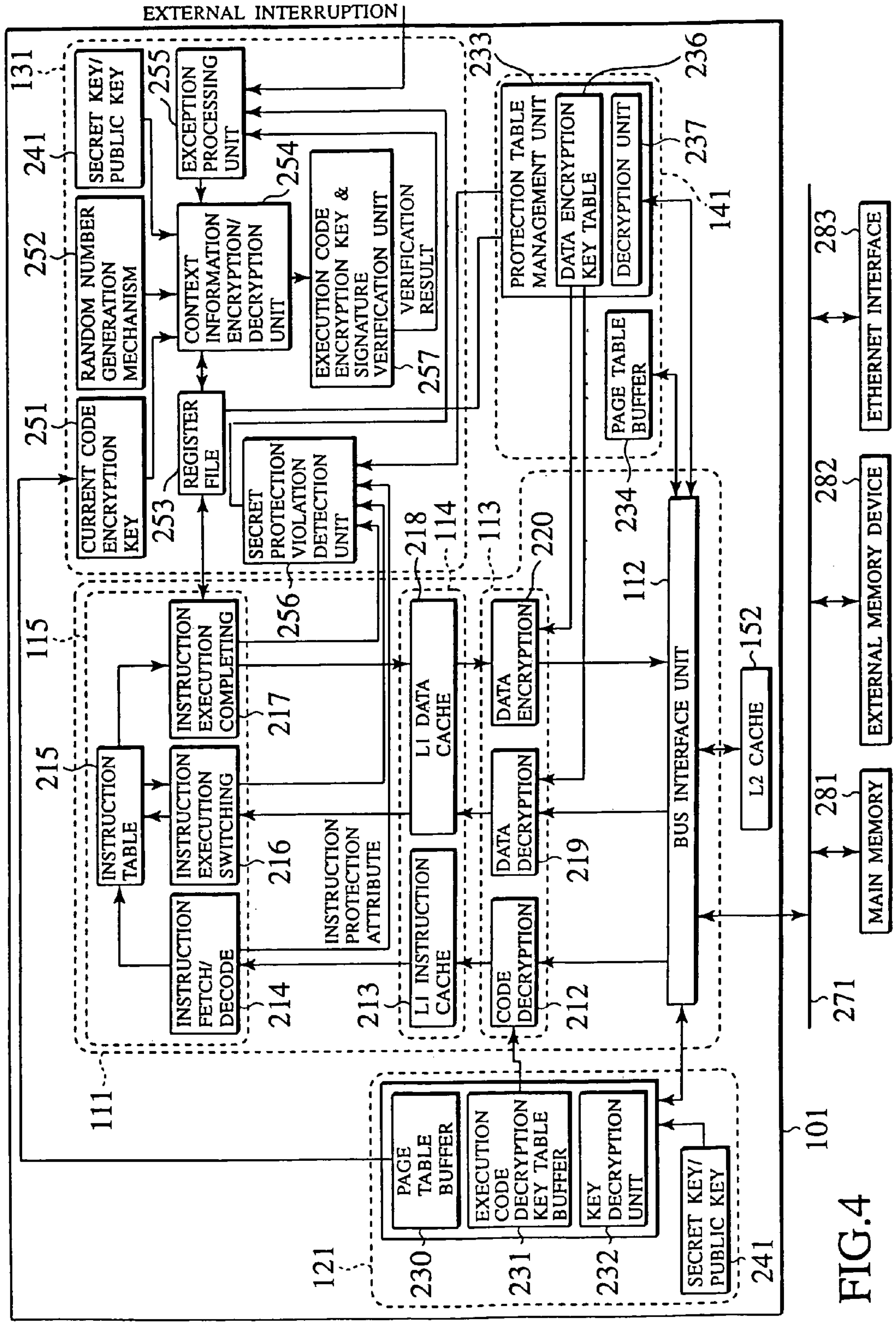
FIG. 4 is a block diagram showing a detailed configuration of the microprocessor of FIG. 3.

FIG. 3 shows a basic configuration of the microprocessor according to this embodiment, and FIG. 4 shows a detailed configuration of the microprocessor shown in FIG. 3.

The microprocessor 101 has a processor core 111, an instruction TLB (Table Lookup Buffer) 121, an exception processing unit 131, a data TLB (Table Lookup Buffer) 141, a secondary cache 152. The processor core 111 includes a bus interface unit 112, a code and data encryption/decryption processing unit 113, a primary cache 114, and an instruction execution unit 115.

The instruction execution unit 115 further includes an instruction fetch/decode unit 214, an instruction table 215, an instruction execution switching unit 216, and an instruction execution completing unit 217.

The exception processing unit 131 further includes a register file 253, a context information encryption/decryption unit 254, an exception processing unit 255, a secret protection violation detection unit 256, and an execution code encryption key and signature verification unit 257.

The instruction TLB 121 further includes a page table buffer 230, an execution code decryption key table buffer 231, and a key decryption unit 232. The data TLB 141 further includes a protection table management unit 233.

The microprocessor 101 has a key storage region 241 for storing a public key Kp and a secret key Ks which are unique to this microprocessor. Now, consider the case of purchasing a desired execution program A from some program vendor and executing it. The program vendor encrypts the program A by using a common execution code encryption key Kcode ($E_{Kcode}$[A]) before supplying the execution program A, and sends the common key Kcode used for encryption in a form encrypted by using the public key Kp of the microprocessor 101 ($E_{Kp}$[Kcode]) to the microprocessor 101. The microprocessor 101 is a multi-task processor which processes not only this execution program A but also a plurality of different encrypted programs in a quasi parallel manner (that is by allowing interruptions). Also, the microprocessor 101 obviously executes not only the encrypted programs but also plaintext programs.

The microprocessor 101 reads out a plurality of programs encrypted by using different execution code encryption keys from a main memory 281 external of the microprocessor 101 through the bus interface unit (reading function) 112. The execution code decryption unit 212 decrypts these plurality of read out programs by using respectively corresponding decryption keys, and the instruction execution unit 115 executes these plurality of decrypted programs.

In the case of interrupting the execution of some program, the context information encryption/decryption unit 254 of the exception processing unit 131 encrypts information indicating the execution state up to an interrupted point of the program to be interrupted and the code encryption key of this program by using the public key of the microprocessor 101, and writes the encrypted information into the main memory 281 as the context information.

In the case of restarting the interrupted program, the execution code encryption key and signature verification unit 257 decrypts the encrypted context information by using the secret key of the microprocessor 101, verifies whether the execution code encryption key contained in the decrypted context information (that is the execution code encryptionb key of the program scheduled to be restarted) coincides with the original execution code encryption key of the interrupted program, and restarts the execution of the program only when they coincide.

Here, before describing the detailed configuration and functions of the microprocessor 101, the processing procedure for the execution of plaintext instructions and the execution of encrypted programs by the microprocessor 101 will be outlined.

When the microprocessor 101 executes a plaintext instruction, the instruction fetch/decode unit 214 attempts to read the content of an address indicated by a program counter (not shown) from an L1 instruction cache 213. If the content of the specified address is cached, the instruction is read out from the L1 instruction cache 213, sent to the instruction table 215, and executed. The instruction table 215 is capable of executing a plurality of instructions in parallel, and requests reading of data necessary for carrying out the execution to the instruction execution switching unit 216 and receives the data. When the instructions are executed in parallel and their execution results are determined, the execution results are sent to the instruction execution completing unit 217. The instruction execution completing unit 217 writes the execution result into the register file 253 when the operation target is a register inside the microprocessor 101, or into an L1 data cache 218 when the operation target is a memory.

The content of the L1 data cache 218 is cached once again by an L2 cache 152 under the control of the bus interface unit 112, and written into the main memory 281. Here, the virtual memory mechanism is used, where a correspondence between the logical memory address and the physical memory address is defined by a page table shown in FIG. 5.

The page table is a data structure placed on the physical memory. The data TLB 141 actually carries out a conversion from the logical address to the physical address, and at the same time manages the data cache. The data TLB 141 reads a necessary portion of the table according to a top address of the table indicated by a register inside the microprocessor 101, and carries out the operation for converting the logical address into the physical address. At this point, only the necessary portion of the page table is read out to a page table buffer 234 according to the logical address to be accessed, rather than reading out the entire page table on the memory to the data TLB 141.

The basic cache operation is stable regardless of whether the instructions of the program are encrypted or not. Namely, a part of the page table is read out to the instruction TLB 121, and the address conversion is carried out according to the definition contained therein. The bus interface unit 112 reads instructions from the main memory 281 or the L2 cache 152, and instructions are stored in the L1 instruction cache 213. The reading of instructions out to the L1 instruction cache 213 is carried out in units of a line formed by a plurality of words, which enables a faster access than the reading in word units.

The address conversion utilizing the same page table on the physical memory is also carried out for the processing target data of the executed instructions, and the execution of the conversion is carried out at the data TLB 141 as described above.

The operation up to this point is basically the same as the general cache memory operation.

Next, the operation in the case of executing an encrypted program will be described. In this embodiment, it is assumed that the execution codes for which secrets are to be protected are all encrypted, and the encrypted execution codes will also be referred to as protected codes. In addition, a range of the protection by the same encryption key will be referred to as a protection domain. Namely, a set of codes protected by the same encryption key is belonging to the same domain, and codes protected by different encryption keys are belonging to different protection domains.

First, the execution codes of a program encrypted by the secret key scheme block cipher algorithm are stored on the main memory 281. A method for loading the encrypted program transmitted from a program vendor will be mentioned below.

A cipher block size of the execution codes can be any value as long as two to the power of the block size coincides with a line size that is a unit for reading/writing with respect to the cache memory. However, if the block size is so small that a block length coincides with an instruction length, there arises a possibility for analyzing the instruction easily by recording a correspondence between encrypted data and a predictable portion of the instruction such as a top portion of a sub-routine. For this reason, in this embodiment, the blocks are interleaved such that there is a mutual dependency among data in the blocks and the encrypted block contains information on a plurality of instruction words or operands. In this way, it is made difficult to set a correspondence between the instruction and the encrypted block.

FIGS. 7A and 7B show an example of the interleaving that can be used in this embodiment. In this example, it is assumed that the line size of the cache is 32 bytes and the block size is 64 bits (i.e., 8 bytes). As shown in FIG. 7A, before the interleaving, one word is formed by 4 bytes, so that a word A is formed by 4 bytes of A0 to A3. One line is formed by 8 words of A to H. When this is interleaved in units of 8 bytes corresponding to the block size of 64 bits, as shown in FIG. 7B, A0, B0, . . . , H0 are arranged in the first block corresponding to word 0 and word 1, A1, B1, . . . , H1 are arranged in the next block, and so on.

An attack can be made more difficult by setting a length of a region to be interleaved longer, but the interleaving of a region with a length longer than the line size makes the processing more complicated and lowers the processing speed because the decryption/encryption of one cache line would depend on reading/writing of another line. Thus it is preferable to set a range for interleaving within a range of the cache line size.

Here the method for interleaving data of blocks is used such that there is a mutual dependency among data in a plurality of blocks contained in the cache line, but it is also possible to use the other method for generating a dependency among data blocks, such as the CBC (Cipher Block Chaining) mode of the block cipher.

Figure 5:
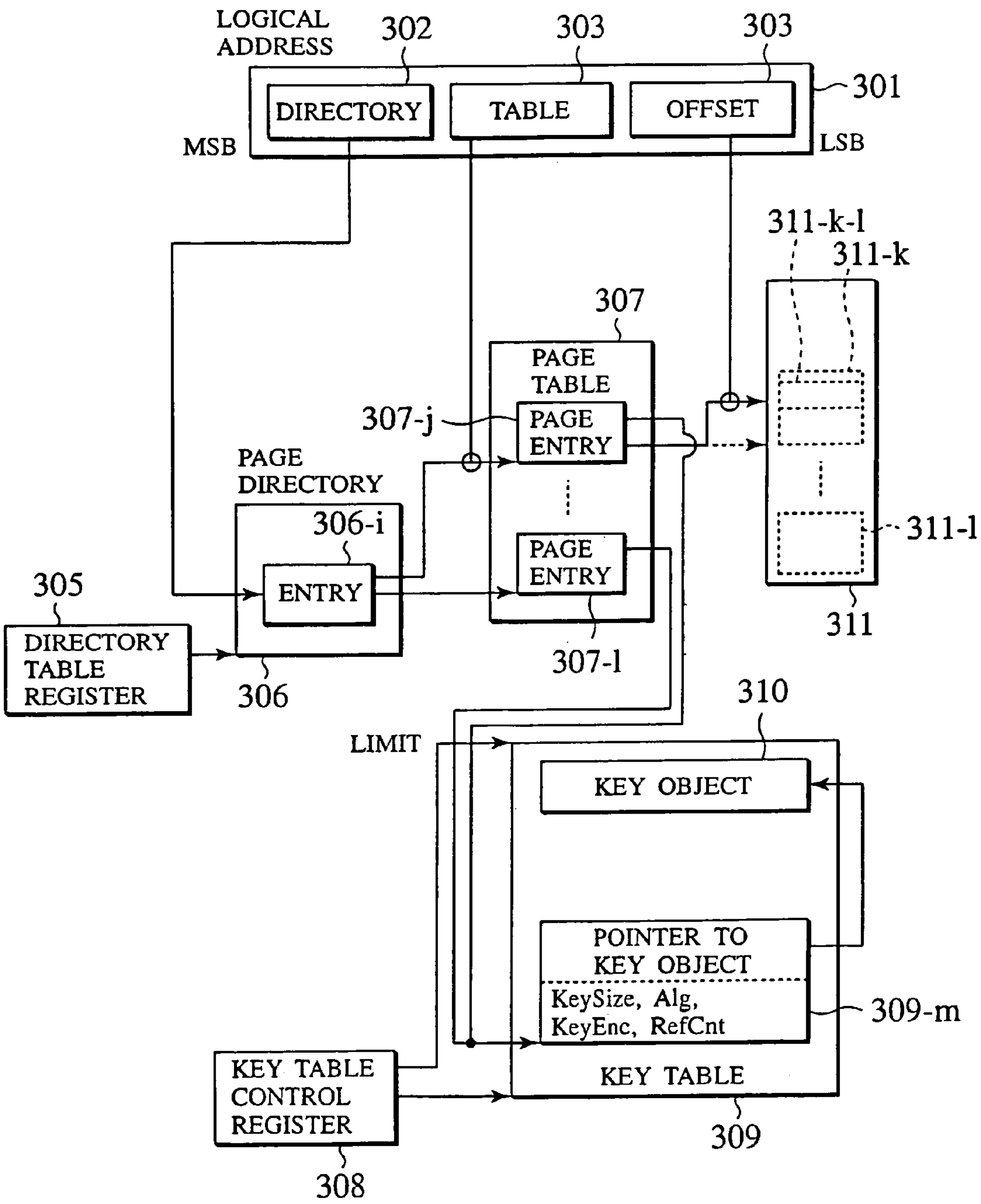
FIG. 5 is a diagram showing a page directory and a page table format used in the microprocessor of FIG. 3.
Figure 6:
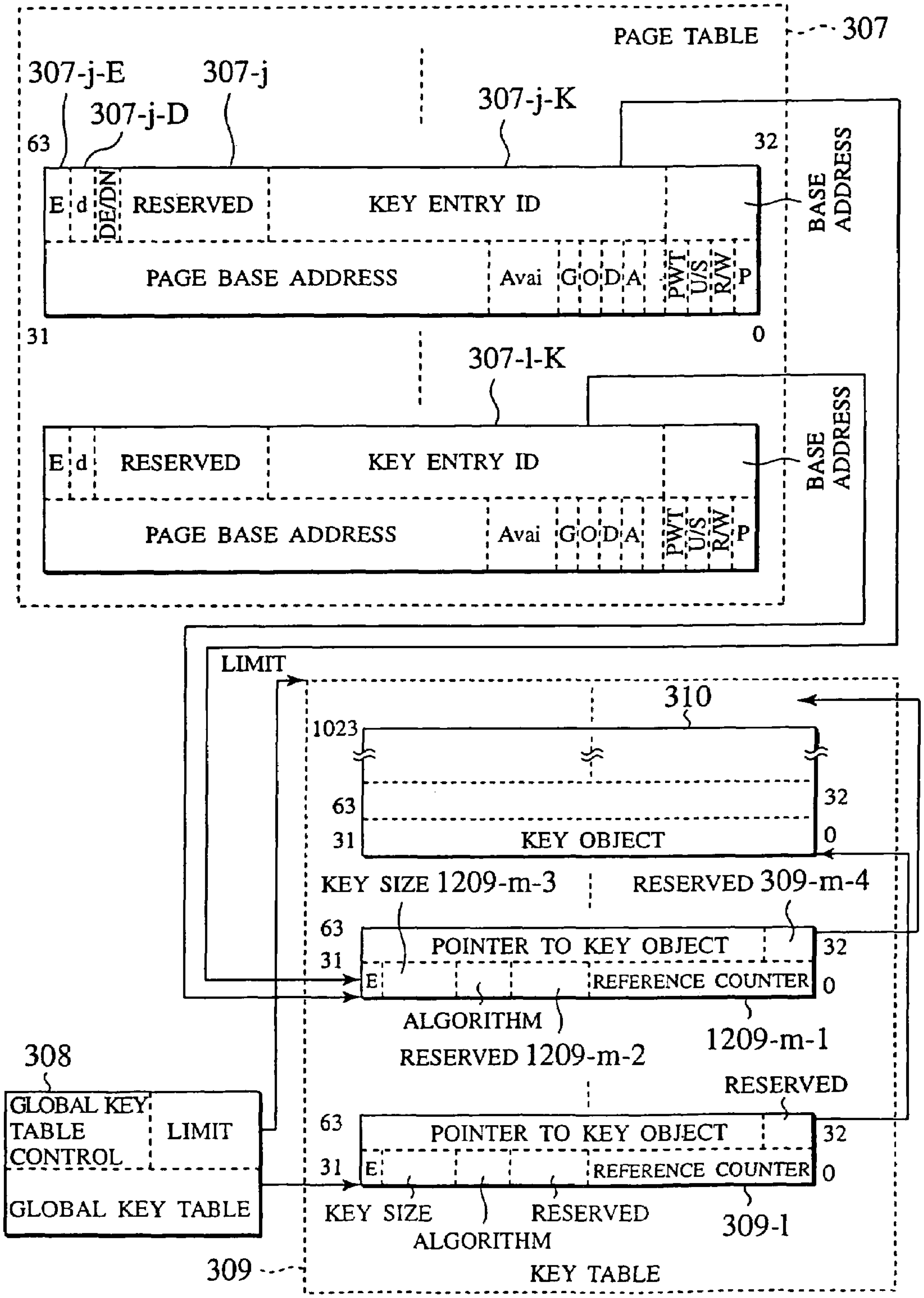
FIG. 6 is a page table and a key entry format used in the microprocessor of FIG. 3.

The decryption key Kcode (which will also be referred to as the encryption key hereafter even in the case of decryption because the encryption key and the decryption key are identical in the secret key algorithm) of the encrypted execution codes is determined according to the page table. FIG. 5 and FIG. 6 show a table structure of the conversion from the logical address to the physical address.

A logical address 301 of the program counter indicates some value, and a directory 302 and a table 303 constituting its upper bits specify a page entry 307-*j*. The page entry 307-*j* contains a key entry ID 307-*j*-*k*, and a key entry 309-*m* to be used for decryption of this page is determined in a key table 309 according to this ID. The physical address of the key table 309 is specified by a key table control register 308 inside the microprocessor.

In this configuration, the ID of the key entry is set in the page entry rather than setting the key information directly, such that the key information in a large size is shared among a plurality of pages so as to save a limited size of a memory region on the instruction TLB 121.

In further detail, the page table and key table information is stored into the instruction TLB 121 as follows. Only portions necessary for the access to the memory is read out from the page tables 306, 307 and 311 to the page table buffer 230, and from the key table 309 to the execution code decryption key table buffer 231.

In a state of being stored on the main memory, a reference counter of the key object 309-*m* which is an element of the key table 309 indicates the number of page tables that refer to this key object. In a state where the key object is read out to the execution code decryption key table buffer 231, this reference counter indicates the number of page tables that refer to this key object and that are read out to the page table buffer 230. This reference counter will be used for judgement at a time of deleting any unnecessary key object from the execution code decryption key table buffer 231.

One of the features of this embodiment is that the key table entry has a fixed length but a key length used in each table is made variable in order to be able to deal with a higher cryptoanalytic power, and specified at a key size region of the key table. It implies that the secret key Ks unique to the microprocessor 101 is fixed but the length of Kcode to be used for encryption and decryption of the program can be changed by the specification of the key entry. In order to specify a position of the variable length key, the key entry 309-*m* has a field 309-*m*-4 pointing to the key entry, which indicates an address of the key object 310.

In the key object region 310, the execution code encryption key Kcode is stored in a form $E_{KP}$[Kcode] encrypted by the public key algorithm using the public key Kp of the microprocessor 101. In order to encrypt data safely in the public key algorithm, a large redundancy is necessary, so that a length of the encrypted data becomes longer than a length of the original data. Here, lengths of Ks and Kp are set to be 1024 bits, a length of Kcode is set to be 64 bits, which is extended to 256 bits by padding, and E[Kcode] is encrypted in a length of 1024 bits and stored in the key object region 310. When Kcode is so long that it cannot be stored in 1024 bits, it is divided into a plurality of blocks of 1024 bits size each and stored.

Figure 8:
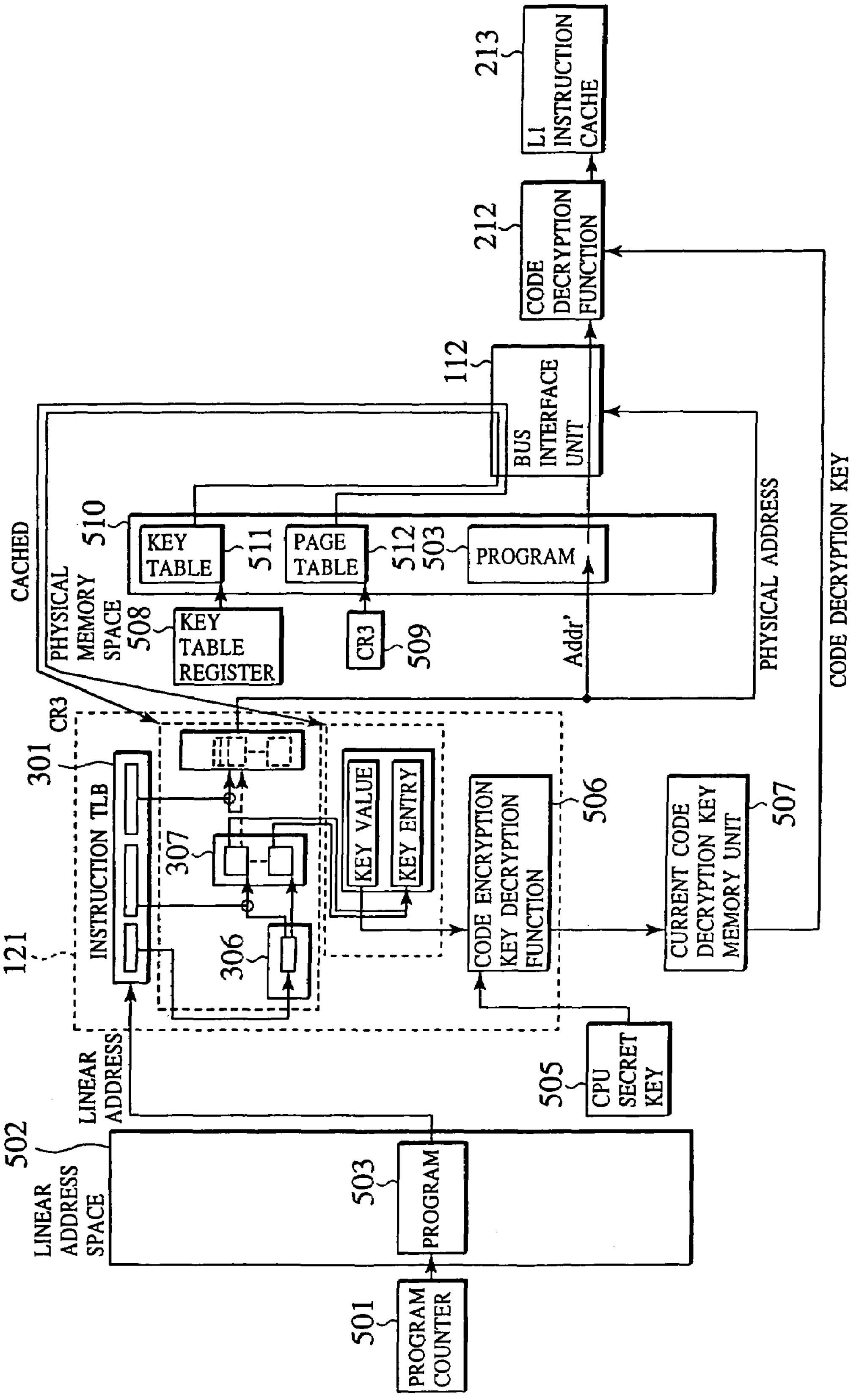
FIG. 8 is a diagram showing a flow of information for a code decryption processing to be carried out in the microprocessor of FIG. 3.

FIG. 8 summarizes the information flow in the code decryption. A program counter 501 indicates an address "Addr" on an encrypted code region 502 on a logical address space 502. The logical address "Addr" is converted into the physical address "Addr'" according to the page table 307 that is read out to the instruction TLB 121. At the same time, the encrypted code decryption key E[Kcode] is taken out from the key table 309, decrypted by using the secret key Ks provided in the CPU at a decryption function 506, and stored into a current code decryption key memory unit 507. The common key Kcode for the code encryption is encrypted by using the public key Kp of the microprocessor 101 by the program vendor, and supplied along with the program encrypted by using Kcode, so that the user who does not know the secret key Ks of the microprocessor 101 cannot know Kcode.

After the program execution codes are encrypted by using Kcode and shipped, the program vendor keeps and manages Kcode safely such that its secret will not be leaked to a third party.

An entire key table 511 and an entire page table 512 are placed in a physical memory 510, and their addresses are specified by a key table register 508 and a CR3 register 509 respectively. From the contents of these entire tables, only necessary portions are cached into the instruction TLB 121 through the bus interface unit 112.

Now, when a content 503 corresponding to the physical address "Addr'" as converted by the instruction TLB 121 is read out by the bus interface unit 112, this page is encrypted so that it is decrypted at a code decryption function 212. The reading is carried out in units of the cache line size, and after the decryption in block units, the inverse processing of the interleaving described above is carried out. The decrypted result is stored in the L1 instruction cache 213, and executed as an instruction.

Here, the method for loading the encrypted program and the relocation of the encrypted program will be described. For the loading of a program into the memory, there is a method in which a program loader changes an address value contained in the execution codes of the program in order to deal with a change of an address for loading the program, but this method is not applicable to the encrypted program. However, the relocation of the encrypted program is possible by using a method of realizing the relocation without directly rewriting the execution codes by utilizing a table called jump table or IAT (Import Address Table).

Further details of the loading procedure and the relocation for general programs can be found, for example, in L. W. Allen et al., "Program Loading in OSF/1, USENIX winter, 1991, and the loading method and the relocation for the encrypted program can be found in Japanese Patent Application No. 2000-35898 of the applicants.

It is possible to protect the execution codes placed on the memory external of the processor by the above described method for decrypting the encrypted execution codes of the program, reading them out to the cache memory inside the processor, and executing them.

However, the execution codes that are decrypted into plaintext can exist inside the processor. Even if it is impossible to read them out directly from outside the processor, there is a possibility for the plaintext program to be read out and analyzed by the other programs that are operated in the same processor.

In this embodiment, the key decryption processing by using the secret key 241 and the key decryption unit 232 of the instruction TLB 121 is not carried out at a time of data reading into an L1 data cache 218. When the data reading is carried out with respect to an encrypted page for which an encryption flag 307-J-E is set to "1" in the page table, either non-decrypted original data or data of a prescribed value "0" will be read out, or else an exception occurs such that the normally decrypted data cannot be read out. Note that when the encryption flag 307-J-E in the page table is rewritten, the decrypted content of the corresponding instruction cache will be invalidated.

By this mechanism, it becomes impossible for the other programs (including the own program) to read the execution codes of the encrypted program as data, and decrypt them by utilizing functions of the processor.

Also, the other programs cannot explicitly read data in the instruction cache, so that the safety of the execution codes can be guaranteed. The safety of the data will be described below.

Because the encrypted execution codes can be executed in this way, in the microprocessor of this embodiment, by selecting the encryption algorithm and parameters appropriately, it can be made cryptographically impossible for a party who does not know the true value of the execution code encryption key Kcode to analyze the operation of the program by de-assembling the execution codes.

Thus the user cannot know the true value of the execution code encryption key Kcode, and it can be made cryptographically impossible for the user to make an alteration according to the user's intention such as illegal copying of the contents handled by the application by altering a part of the encrypted program.

Next, another feature of the microprocessor of this embodiment regarding the encryption, signature and its verification for the context at a time of interrupting the program execution under the multi-task environment will be described.

The execution of the program under the multi-task environment is often interrupted by the exception. Normally, when the execution is interrupted, a state in the processor is saved on the memory, and then the original state is recovered at a time of restarting the execution of that program later on. In this way, it becomes possible to execute a plurality of programs in a quasi parallel manner and accept the interruption processing. This information on the state at a time of the interruption is called the context information the context information contains information on registers used by the application, and in some cases, information on registers that are not explicitly used by the application is also contained in addition.

In the conventional processor, when the interruption occurs during the execution of some program, the control is shifted to the execution codes of the OS while the register state of the application is maintained, so that the OS can check the register state of that program to guess what instructions were executed, or alter the context information maintained in a plaintext form during the interruption so as to change the operation of the program after the restart of the execution of that program.

In view of this fact, in this embodiment, when the interruption occurs during the execution of the protected codes, the context of the execution immediately before that is encrypted and saved while all the application registers are either encrypted or initialized, and a signature made by the processor is attached to the context information. The signature is verified at a time of recovery from the interruption, to check whether the signature is proper or not. When the improper signature is detected, the recovery is stopped so that the illegal alteration of the context information by the user can be prevented. At this point, the encryption target registers are user registers 701 to 720 shown in FIG. 9.

In the Pentium Pro architecture, there is a hardware mechanism for assisting the saving of the context information of the process into the memory and its recovery. A region for saving the state is called TSS (Task State Segment). In the following, an exemplary case of applying the present invention to this mechanism will be described, but the present invention is not limited to the Pentium Pro architecture, and equally applicable to any processor architectures in general.

The saving of the context information in conjunction with the exception occurrence takes place in the following case. When the exception occurs, an entry corresponding to the interruption cause is read out from a table called IDT (Interrupt Descriptive Table) for describing the exception processing, and the processing described there is executed, When the entry indicates a TSS, the context information saved in the indicated TSS is recovered to the processor. On the other hand, the context information of the process that has been executed up until then is saved in the TSS region specified by a task register 725 at that point.

Using this automatic context saving mechanism, it is possible to save the entire state of the application including the program counter and the stack pointer, and detect any alteration at a time of the recovery by verifying the signature. However, when this automatic context saving is used, apart from the fact that a large overhead will be caused by the context switching, there arises a problem that it is impossible to carry out the interruption processing without using the TSS.

In order to reduce the overhead due to the interruption processing, or to maintain the compatibility with the existing programs, it is preferable not to use the automatic context saving mechanism, but in such a case, the program counter will be saved on the stack and cannot be a target of the verification, so that it can be a target of the alteration by the malicious OS. These two cases should preferably used in their proper ways according to the purpose. For this reason, the microprocessor of this embodiment adopts the automatic context saving with respect to the protected (encrypted) execution codes as a result of attaching more importance to the safety. The registers to be automatically saved may not necessarily be all registers.

The context saving and recovery processing in this embodiment has the following three major features.

(1) The contents of the saved context can be decrypted only by the microprocessor that generated the context and a person who knows the encryption key Kcode of the program that generated the context.

(2) In the case where the program protected by some execution code encryption key X is interrupted and its context is saved, its restart processing cannot be applied to the restart of a non-protected program or a program encrypted by another execution code encryption key Y. Namely, the program to be recovered from the interruption cannot be replaced by another program at a time of the restart.

(3) The recovery of the altered context is prohibited. Namely, if the saved context is altered, that context will not be recovered.

By the above feature (1), it is possible to maintain the safety of the context information while enabling the analysis of the context information by the program vendor. The fact that the program vendor has a right to analyze the context information is important in order to maintain the quality of the program by analyzing causes of any trouble that occurred according to a condition by which the program is used by the user.

The above feature (2) is effective in preventing a situation where an attacker applies the context generated by the execution of a program A to another encrypted program B and restarts the program B from a known state saved in the context in order to analyze secrets of the data or the codes contained in the program B or alter the operation of the program B. This function is also a prerequisite for the data protection to be described below in which each one of a plurality of applications maintains own encrypted data exclusively and independently from the others.

By the above feature (3), it is possible to strictly eliminate the alteration of the context information utilizing an occasion of the restart of the program.

The reason for providing such a function is that simply encrypting the context information according to the secret information of the processor can protect the context information from the alteration according to the intention of the attacker, but it is impossible to eliminate a possibility for the random alteration of the context that results in the restart of the program from a state with random errors.

In the following, the context saving and verification method incorporating the above three features will be described in further detail.

<Context Saving Processing>

Figure 10:
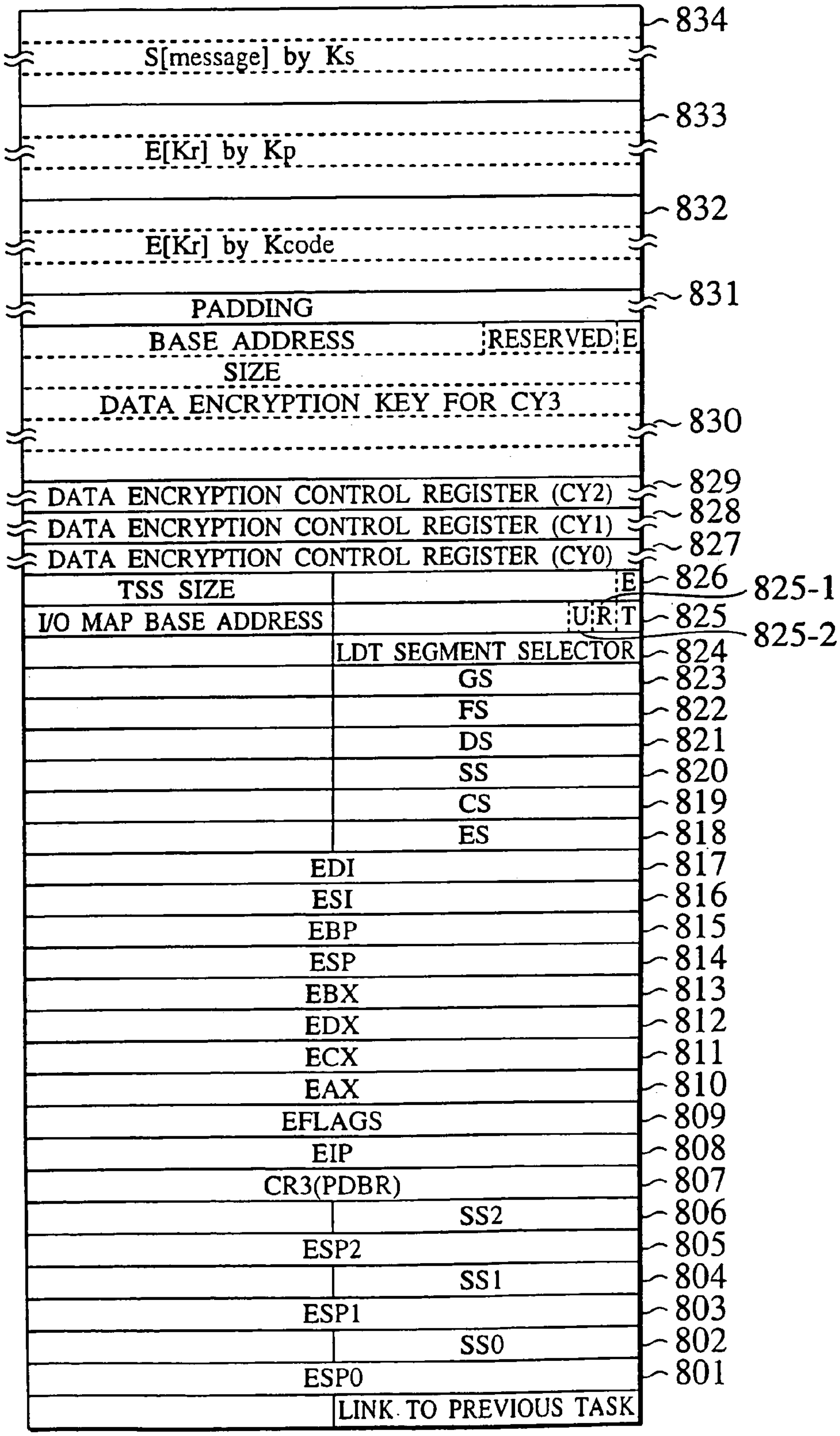
FIG. 10 is a diagram showing a context saving format used in the microprocessor of FIG. 3.

FIG. 10 shows the context saving format in this embodiment conceptually. It is assumed that the interruption due to the hardware or software related cause has occurred during the execution of the protected program. If the IDT entry corresponding to the interruption indicates a TSS, the execution state of the program up to that point is encrypted, and saved as the context information in a TSS indicated by the current task register 725 (rather than the indicated TSS itself). Then, the execution state saved in the TSS indicated by the IDT entry is recovered to the processor. If the IDT entry does not indicate a TSS, only the encryption or the initialization of the current registers is carried out, and the saving into the TSS does not takes place. Of course the restart of that program becomes impossible in that case. Note however that the system registers including a part of the flag registers and the task register are excluded from a target of the encryption or the initialization of the registers for the sake of continuation of the OS operation.

The contents of the context shown in FIG. 10 are actually interleaved, encrypted in block units and stored in the memory. Here the information items to be saved will be described first. At a top, stack pointers and user registers 802 to 825 corresponding to respective privileged modes are provided, and one word 826 indicating a TSS size and the presence/absence of the encryption is placed next. This indicates whether the TSS in which the processor is saved is encrypted or not. Even in the case where the TSS is encrypted, this region will be maintained in a plaintext form without being encrypted.

After that, data encryption control register (CY0 to CY3) regions 827 to 830 that are added for the purpose of the data protection are placed, and a padding 831 for adjusting the size to the block length is placed. Finally, a value $E_{Kcode}$[Kr] 832 in which a key Kr used in encrypting the context is encrypted by the secret key algorithm using the execution code encryption key Kcode, a value $E_{Kp}$[Kr] 833 in which the key Kr used in encrypting the context is encrypted by using the public key Kp of the processor, and a signature $S_{Ks}$[message] 834 using the secret key Ks of the processor with respect to them all are placed. Also, a region 801 for a link to the previous task that maintains a call up relationship among tasks is saved in a plaintext form in order to enable the task scheduling by the OS.

These execution code encryption and signature generation are carried out by the context information encryption/decryption unit 254 in the exception processing unit 131 shown in FIG. 4, which is based on a function independent from the encryption of the processing target data of the execution codes. At a time of saving the context information in the TSS, even if some encryption is specified in an address of the TSS by the other data encryption function, this specification is ignored and the context information is saved in a state in which the context is encrypted. This is because the encryption attributes of the data encryption function are specific to each protected (encrypted) program so that the restart of some program cannot depend on that function.

In encrypting the context, a word in the TSS size region 826 to be recorded in a plaintext form is replaced to a value "0". Then, the interleaving similar to that explained with references to FIGS. 7A and 7B is applied, and the context is encrypted. At this point, the padding 831 is set to a size that enables the appropriate interleaving in accordance with the encryption block size.

Here, the reason for not encrypting the register values directly by the public key Kp of the processor or the execution code encryption key Kcode is to enable the analysis of the encrypted context by both the program vendor and the processor while prohibiting the decryption of the context by the user.

The program vendor knows the execution code encryption key Kcode so that the program vendor can obtain the encryption key Kr of the context by decrypting $E_{Kcode}$[Kr] 832 by using Kcode. Also, the microprocessor 101 can obtain the encryption key Kr of the context by decrypting $E_{Kp}$[Kr] 833 by using the own secret key Ks. Namely, the program vendor can analyze the trouble by decrypting the context information without knowing the secret key of the microprocessor of the user, and the microprocessor 101 itself can restart the execution by decrypting the context information by using the own secret key Ks. The user who does not have either key cannot decrypt the saved context information. Also, the user who does not know the secret key Ks of the microprocessor 101 cannot forge the context information and the signature $S_{Ks}$[message] with respect to $E_{Kcode}$[Kr] and $E_{Kp}$[Kr].

In order to enable the mutually independent decryption of the context information by the program vendor and the microprocessor, it is also possible to consider a method for encrypting the context information directly by using Kcode. However, in the case where the register state is already known, there is a possibility for the known-plaintext attack against the execution code encryption key Kcode. Namely, when a value of the key for encrypting data is fixed, the following problem arises. Consider the case of executing a program which reads a data input by the user and writes it into a working memory temporarily by encrypting it. The data that are to be encrypted and written into the working memory can be ascertained by monitoring the memory, so that the user can repeat the input many times by changing the input value and obtain the corresponding encrypted data. This implies that the chosen-plaintext attack of the cryptoanalysis theory is possible.

The known-plaintext attack is not fatal to the secret key algorithm, but it is still preferable to avoid that. For this reason, a random number Kr is generated at a random number generation mechanism 252 of the exception processing unit 131 at each occasion of the context saving, and supplied to the context information encryption/decryption unit 254. The context information encryption/decryption unit 254 encrypts the context by the secret key algorithm using the random number Kr. Then, the value $E_{Kcode}$[Kr] 832 in which the random number Kr is encrypted by the same secret key algorithm using the execution code encryption key Kcode is attached. The value $E_{Kp}$[Kr] 833 is obtained by encrypting the random number Kr by the public key algorithm using the public key Kp of the microprocessor.

Here, the random number is generated by the random number generation mechanism 252. In the case where the program is encrypted, normally there is no change in the program codes so that the corresponding plaintext codes cannot be acquired illegally as long as the operation is not analyzed. In this case, there is a need to carry out the "ciphertext-only attack" in order to cryptoanalyze, so that it is very difficult to find the encryption key. However, in the case where the data entered by the user are to be stored into the memory by encrypting them, the user can freely select the input data. For this reason, it is possible for the user to make the "chosen-plaintext attack" against the encryption key which is far more effective than the "ciphertext-only attack".

Against the chosen-plaintext attack, it is possible to adopt a measure for enlarging the search space by adding a random number called "salt" into the plaintext to be protected. However, it is very tedious to implement the saving into the memory in a form where the "salt" random number is incorporated in every data at the application programming level, so that this can cause the lowering of the programming efficiency and performance.

For this reason, the random number generation mechanism 252 generates the random number (encryption key) for encrypting the context at each occasion of the context saving. As the encryption key can be selected arbitrarily, there is also an effect that the safe communications between processes or between processes and devices can be realized faster. This is because the speed for encrypting data by the hardware at a time of the memory access is far slower in general than the speed for encrypting data by the software.

On the contrary, if the value of the encryption key for the data region is limited to a prescribed value such as that identical to the execution code encryption key for example, then it becomes impossible to use the data encryption function of the processor for the other programs encrypted by the other encryption keys or the sharing of the encrypted data with the devices, so that it becomes impossible to take advantage of the fast hardware encryption function provided in the processor.

Note that the decryption of the encrypted random number $E_{Kcode}$[Kr] 832 that takes place at a time of the restart and the generation of the signature 834 can be based on any algorithm and secret information as long as a condition that they can be carried out only by the microprocessor 101 is satisfied. In the above example, the secret key Ks unique to the microprocessor 101 (which is also used for the decryption of the execution code encryption key Kcode) is used for both, but respectively different values may be used for these purposes.

Also, the saved context contains a flag indicating the presence/absence of the encryption, so that the encrypted context information and the non-encrypted context information can coexist according to the need. The TSS size and the flag indicating the presence/absence of the encryption are stored in a plaintext form so that it is easy to maintain the compatibility with respect to the past programs.

<Processing for Restarting the Interrupted Program>

At a time of restarting the process by recovering the context, the OS issues a jump or call instruction with respect to a TSS descriptor indicating the saved TSS.

Returning now to FIG. 4, the execution code encryption key and signature verification unit 257 if the exception processing unit 131 verifies the signature $S_{KS}$ [message] 834 by using the secret key Ks of the processor first, and sends the verification result to the exception processing unit 255. In the case where the verification result is failure, the exception processing unit 255 stops the restart of the execution of the program, and causes the exception. By this verification, it is possible to confirm that the context information is surely generated by the proper microprocessor 101 that has the secret key and not altered.

When the verification of the signature succeeds, the context information encryption/decryption unit 254 obtains the random number Kr by decrypting the context encryption key $E_{Kp}$[Kr] 833 by using the secret key Ks. On the other hand, the execution code encryption key Kcode corresponding to the program counter (EIP) 809 is taken out from the page table buffer 230, and sent to the current code encryption key memory unit 251. The context information encryption/decryption unit 254 decrypts $E_{Kcode}$[Kr] by using the execution code decryption key Kcode, and sends the result to the execution code encryption key and signature verification unit 257. The execution code encryption key and signature verification unit 257 verifies whether the decryption result of $E_{Kcode}$[Kr] 832 coincides with the decryption result of the microprocessor using the secret key Ks or not. By this verification, it is possible to confirm that this context information is generated by the execution of the execution codes encrypted by using the secret key Kcode.

If this verification of the execution code encryption key with respect to the context information is not carried out, it would become possible for the user to make an attack by producing codes encrypted by using any suitable secret key Ka and applies the context information obtained by executing these codes to the codes encrypted by the other secret key Kb. The above verification eliminates a possibility of this attack and guarantees the safety of the context information for the protected codes.

This object can also be achieved by adding a secret execution code encryption key Kcode to the context information, but in this embodiment, by the use of the value $E_{Kcode}$[Kr] in which a secret random number Kr used in encrypting the context information is encrypted by using the execution code encryption key Kcode selected by the program vendor, it is possible to reduce the amount of memory required for saving the context information so as to achieve the effects of the fast context switching and the memory saving. This also enables the feedback of the context information to the program creator.

Now, when the verification of the execution code encryption key and the verification of the signature by the execution code encryption key and signature verification unit 257 both succeed, the context is recovered to the register file 253, and the program counter value is also recovered so that the control is returned to an address at a time of the execution interruption that caused to generate this context.

When either one of these verifications fails so that the exception processing unit 255 causes the exception to occur, an exception occurrence address indicates an address at which the jump or call instruction is issued. Also, a value indicating illegality of the TSS is stored into an interruption cause field in the IDT table, and an address of a jump target TSS is stored into a register that stores an address that is the cause of the interruption. In this way, the OS can learn the cause of the context switching failure.

Note that, in order to realize the faster restart processing, it is also possible to use a configuration in which the supply of the execution state encrypted by the context information encryption/decryption unit 254 to the register file 253 and the verification processing by the execution code encryption key and signature verification unit 257 are carried out in parallel, and the subsequent processing is stopped when the verification fails.

The safety of this encryption scheme using a random number depends on the impossibility to predict a random number sequence used, and a method for generating by hardware a random number that is very hard to predict is disclosed in Onodera, et al., Japanese Patent No. 2980576.

The analysis of the context information by the program vendor is important in improving the quality of the program by analyzing the causes of any trouble in the program that occurred according to a condition by which the program is used by the user. In this embodiment, in view of this fact, the above described scheme for realizing both the safety of the context and the capability of the context information analysis by the program vendor is employed, but it is also true that the use of this scheme increases the overhead of the context saving.

Moreover, the verification of the context information by using the signature made by the microprocessor prevents the execution of the protected codes in the illegal context information by using a combination of arbitrarily selected value and encryption key, but this additional protection also increases the overhead.

Consequently, in the case where there is no need for the capability of the context information analysis by the program vendor or a mechanism for eliminating the program restart using the illegal context information, the context information containing information for identifying the execution code encryption key may be directly encrypted by using the secret key of the processor. Even in such a case, it is still possible to make the intentional alteration of the context cryptographically impossible, and prevent the context information from being applied to a program encrypted by using a different encryption key.

Here, the context saving format will be described further. Its relationship with the operation will be described later.

In FIG. 10, an "R" bit 825-1 is a bit indicating whether the context is restartable or not. When this bit is set to "1", the execution can be restarted by recovering the state saved in the context by the above described recovery procedure, whereas when this bit is set to "0", the restart cannot be made. This has an effect of preventing the restart of the context in which the illegality is detected during the execution of the encrypted program so as to limit the restartable contexts to only those in the proper states.

A "U" bit 825-2 is a flag indicating whether the TSS is a user TSS or a system TSS. When this bit is set to "0", the saved TSS is the system TSS, and when this bit is set to "1", the saved TSS is the user TSS. The TSS that will be saved and recovered through the task switching accompanied by the change of the privilege from the exception entry as described above or through a task gate call up is the system TSS.

The difference between the system TSS and the user TSS lies in whether a task register indicating a TSS saving location of the currently executed program is to be updated or not at a time of the recovery of the TSS. In the recovery of the system TSS, the task register of the currently executed program will be saved in the link to the previous task region 801 of the TSS to be newly recovered, and the segment selector of the new TSS will be read into the task register. On the other hand, in the recovery of the user TSS, the update of the task register value will not be carried out. The user TSS is aimed only at the saving and the recovery of the register state of the program so that it is not accompanied by the change of the privileged mode.

The exception includes a software interrupt used for the system call up from the application program. In the case of the software interrupt for the purpose of the system call up, the general purpose register is often used for the parameter exchange, and there can be cases where the context information encryption can obstruct the parameter exchange.

The software interrupt is generated by the application itself, so that it is possible for the application to destroy information of the registers that have secrets, prior to the generation of the software interrupt. Under the presumption of such conditions, it is possible to use a scheme in which the encryption of the registers is not carried out only in the case of the software interrupt. Of course, in such a case, the application program creator should take this fact into consideration and design the program such that the secrets of the program can be protected.

Next, the suppression of the plaintext program debugging function will be described.

The processor has a step execution function which causes the interruption whenever one instruction is executed, and a debugging function which causes the exception whenever a memory access with respect to a specific address is made. These functions may be useful for the development of programs but they can impair the safety of programs that are encrypted for the purpose of the secret protection. Consequently, in the microprocessor of this embodiment, such debugging functions are suppressed during the execution of the encrypted program.

The instruction TLB 121 can judge whether the currently executed code is protected or not (encrypted or not). During the execution of the protected code, two debugging functions including a debug register function and a step execution function are prohibited in order to prevent an intrusion of the encrypted program analysis from a debug flag or a debug register.

The debug register function is a function in which a memory access range and an access type such as reading/writing as the execution code or data are set in advance into a debug register provided in the processor such that the interruption is caused whenever a corresponding memory access occurs. In this embodiment, during the execution of the protected code, the contents set in the debug register will be ignored so that the interruption for the purpose of the debugging will not occur. Note however that the case where a debug bit is set in the page table is excluded from this rule. The debug bit in the page table will be described later.

During the execution of a non-protected (plaintext) code, the interruption will be caused whenever one instruction is executed if a step execution bit in an EFLAGS register of the processor is set, but during the execution of the protected code, this bit will also be ignored so that the interruption will not occur.

In this embodiment, in addition to the encryption of the execution codes for the purpose of preventing the analysis, these functions make the analysis of the program by the user difficult by preventing the dynamic analysis of the program using the debug register or the debug flag.

<Data Protection>

Next, the protection of the processing target data of the execution codes will be described.

Figure 9:
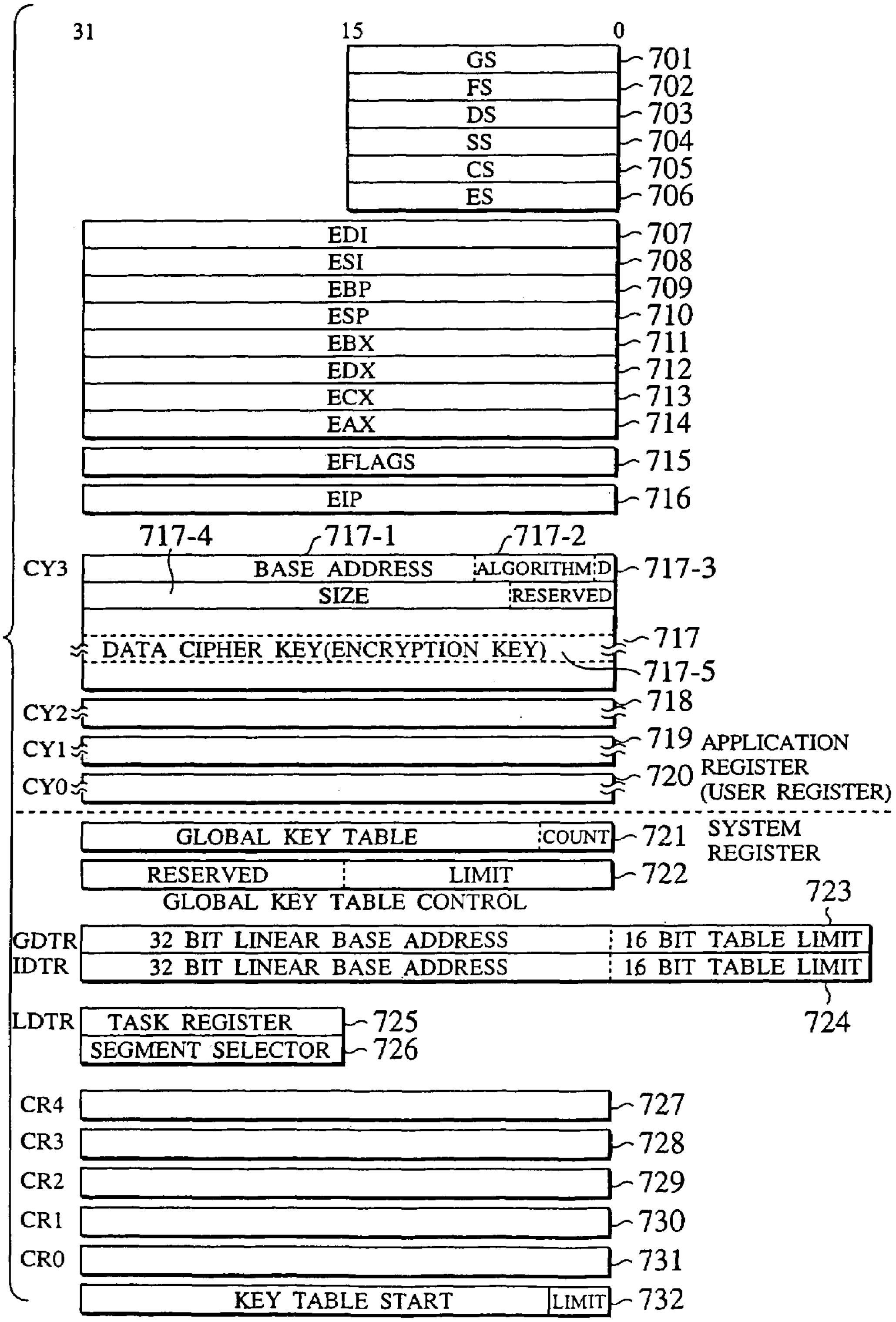
FIG. 9 is a diagram showing a CPU register used in the microprocessor of FIG. 3.

In this embodiment, the encryption attributes for protecting data are defined in four registers CY0 to CY3 that are provided inside the microprocessor 101. They correspond to regions 717 to 720 shown in FIG. 9. In FIG. 9, details of the registers CY0 to CY2 are omitted, and only details of the register CY3 are shown.

Elements of the encryption attribute will now be described by taking the CY3 register 717 as an example. Upper bits of the logical address indicating a top of the region to be encrypted are specified in a base address 717-1. The size of the region is specified in a size region 717-4. A size is specified in units of the cache line so that there is an invalid portion at the lower bits. A data encryption key is specified in a region 717-5. Here the secret key algorithm is used so that the region 717-5 is also used for the decryption key, When a value of the encryption key is specified as "0", it implies that the region indicated by that register is not encrypted.

Among the specifications of the regions, CY0 is given the highest priority, and CY1 to CY3 are given sequentially lower priorities in this order. For example, When the regions specified by CY0 and CY1 overlap, the attributes of CY0 are given the priority over those of CY1 in that region. Also, the definition of the page table is given the highest priority in the case of a memory access as the execution code rather than as the processing target data.

A debug bit 717-4 is used in selecting whether the data operation in the debugging state is to be carried out in an encrypted state or in a plaintext state. Details of the debug bit will be described later.

Figure 12:
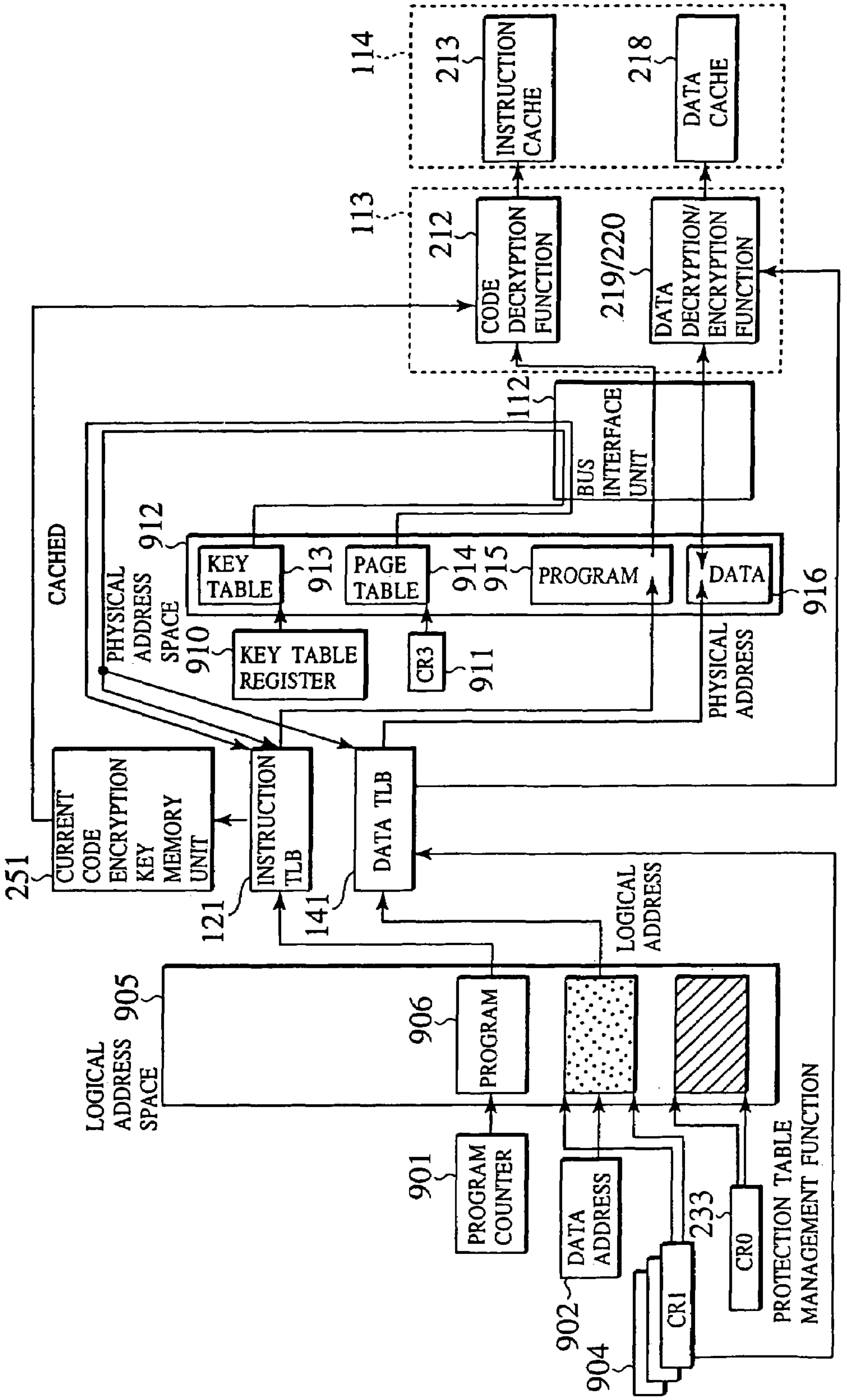
FIG. 12 is a diagram showing a flow of information for data encryption and decryption processing to be carried out in the microprocessor of FIG. 3.

FIG. 12 shows the information flow in the encryption/decryption of the processing target data of the execution codes. Here, the data protection is made only in the state where the code is protected, that is the code is executed in an encrypted state. Note however that the case where the code is executed in the debugging state to be described below will be excluded from this rule. When the code is protected, the contents of the data encryption control registers (which will be also referred to as the encryption attribute registers or the data protection attribute registers) CY0 to CY3 are read from the register file 253 shown in FIG. 4 to a data encryption key table 236 provided inside the data TLB 141.

When some instruction writes data into a logical address "Addr", the data TLB 141 judges whether the logical address "Addr" is contained in ranges of CY0 to CY3 or not by checking the data encryption key table 236 (see FIG. 4). As a result of the judgement, if the encryption attribute is specified, the data TLB 141 commands the code encryption function 212 to encrypt the memory content by the specified encryption key at a time of the memory writing of a corresponding cache line from the L1 data cache 218 to the memory.

Similarly, in the case of reading, if the target address has the encryption attribute, the data TLB 141 commands the data decryption function 219 to decrypt the data by the specified encryption key at a time of the reading of a cache line out to the corresponding L1 data cache 218.

In this embodiment, the data encryption attributes are protected from the illegal rewriting including the privilege of the OS by placing all the data encryption attributes for the data encryption in the registers inside the microprocessor 101 and saving the contents of the registers at a time of the execution interruption as the context information in a safe form into a memory (the main memory 281 of FIG. 4, for example) external of the microprocessor 101.

The data encryption/decryption is carried out in units of the cache line that is interleaved as described above in relation to the context encryption. For this reason, even when one bit of the data on the L1 cache 114 is rewritten, the other bits in the cache line will be rewritten on the memory. The execution of the data reading/writing is carried out collectively in units of the cache line, so that the increase of the overhead is not so large, but it should be noted that the reading/writing with respect to the encrypted memory regions cannot be carried out in units less than or equal to the cache line size.

In the above, the method for protecting the data by encryption in this embodiment has been described. By this method, on the main memory, it is possible to process the encrypted data by encrypting them inside the processor by using the encryption key and the memory range specified by the application program, and read/write them as plaintext data from a viewpoint of the application.

Next, two mechanisms for preventing reading of the data stored in a plaintext form in the cache memory inside the processor by a program other than the encrypted programs that has read these data (which will be referred to as the other program) will be described.

First, the program is identified by its encryption key. This identification is made by using a key object identifier used at a time of decrypting the currently executed instruction inside the processor. Here, a value of the key itself may be used for this identification, but a value of the execution code decryption key has a rather large size of 1024 bits before the decryption or of 128 bits after the decryption which would require an increase of the hardware size, so that the key object identifier which has a total length of only 10 bits is used.

The L1 instruction cache 213 in which the decrypted execution codes are to be stored has an attribute memories in correspondences to the cache lines. When the decrypted execution codes are stored into the L1 instruction cache 213 by the code decryption function 212, the key object identifier is written into the attribute memory.

Also, in the case of reading the encrypted data from the memory and decrypting it, the contents of the data protection attribute registers CY0 to CY3 are read out from the register file 253 to a protection table management function 233 of the data TLB 141. At this point, the key object identifier corresponding to the currently executed instruction is also read from the current code encryption key memory unit 251 at the same time and maintained in the protection table management function 233.

Similarly as in the case of the instruction cache, the data cache 218 has attribute memories in correspondence to the cache lines. When the data read out from the memory is decrypted by the data decryption function 219 and stored into the L1 data cache 218, the key object identifier is written into the attribute memory from the protection table management function 233.

When some instruction is executed and the data referring is carried out, the key object identifier written in the attribute of the data cache and the key object of that instruction in the instruction cache are compared by the secret protection violation detection unit 256. If they do not coincide, the exception of the secret protection violation occurs and the data referring fails. In the case where the attribute of the data cache indicates a plaintext, the data referring always succeeds.

Note that, when the attributes of the instruction and the data do not coincide, instead of causing the exception, it is also possible to discard the content of this data cache and re-read the data from the memory once again.

For example, consider program-1 and program-2 for which the execution code encryption key as well as the data protection attribute registers CY0 to CY3 are different. If the encrypted data referred and written into the cache by the program-1 is to be referred by the program-2, the program-2 will read out a different data. This operation is in accord with the purpose of protecting secrets.

If two programs have the same data encryption key and data at the same address are referred by them, the same data will be read so that this data can be shared between them.

In this way, in this embodiment, data generated by some program-1 can be protected from being referred by another program-2 by providing a function for maintaining attributes of the instruction to be executed and the data indicating programs to which they originally belong, and comparing the attributes to see if they coincide or not at a time of the data referring due to the instruction execution.

<Entry Gate>

In this embodiment, the cases where the control can be shifted from the non-protected code to the protected code are limited only to the following two cases:

(1) the case where the context encrypted by using the execution code encryption key (that is, the context having a random number) that coincides with a restart address is to be restarted; and (2) the case where the control is shifted from a non-protected code to an entry gate instruction ("egate" instruction) of the protected code by the execution of the consecutive codes or by a jump or call instruction.

This limitation is placed in order to prevent an attacker from obtaining information on code fragments by executing the code from arbitrary position. The procedure for the above (1) has already been described in relation to the context recovery. Namely, the control is shifted to the execution of the protected code only when it is verified that the context information matching with the execution code encryption key of the code that was executed immediately before the interruption is contained, and that the proper signature given by the microprocessor 101 is attached.

The above (2) is a processing for prohibiting a transition to the execution of the protected code unless a special instruction called entry gate ("egate") instruction is executed at the beginning of the control in the case of shifting the control from the non-protected code to the protected code.

Figure 11:
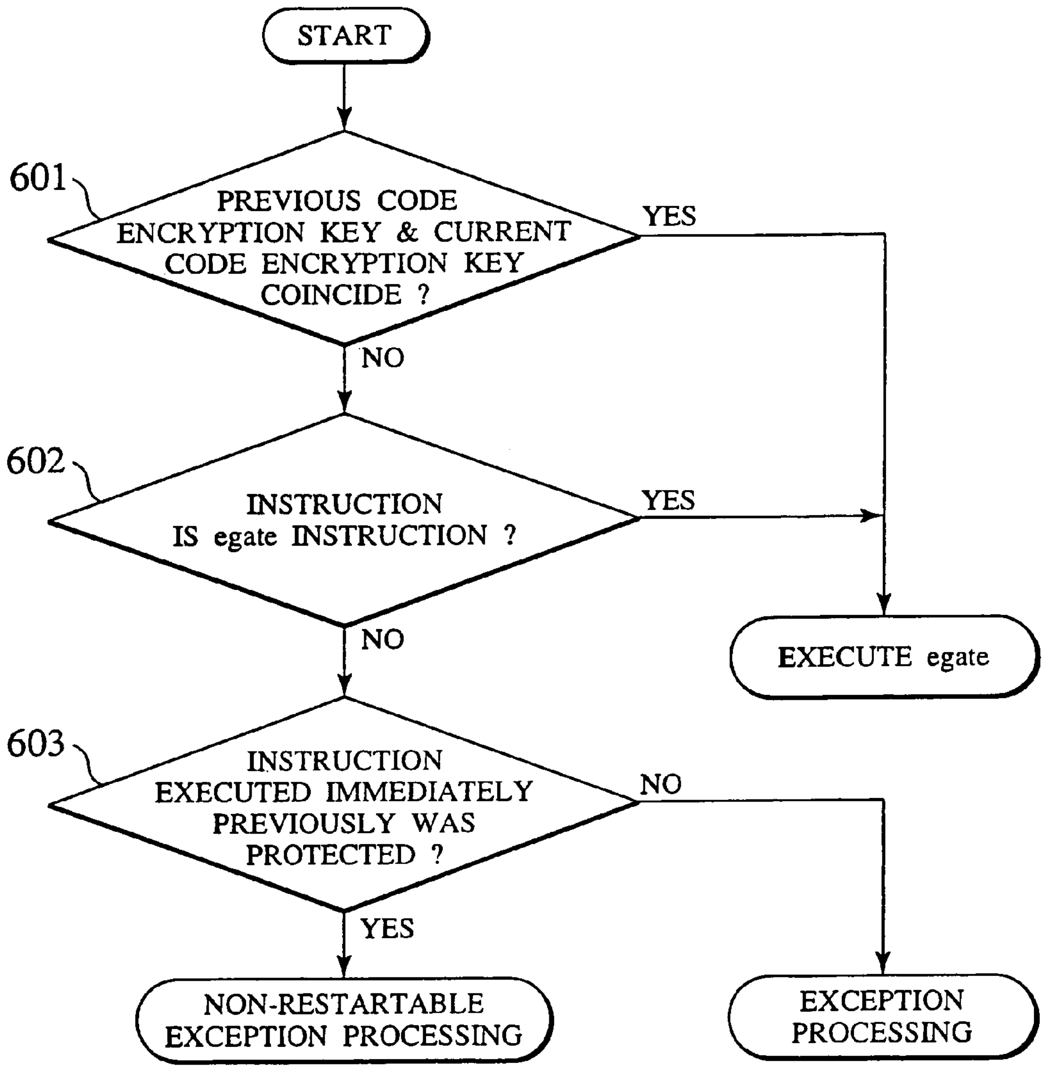
FIG. 11 is a flow chart for a protection domain switching procedure to be carried out in the microprocessor of FIG. 3.

FIG. 11 shows a procedure for switching a protection domain based on the entry gate instruction. The microprocessor 101 is maintaining the encryption key of the currently executed code in the current code encryption key memory unit 251 (see FIG. 4) of the exception processing unit 131. First, whether the value of this key is changed in conjunction with the execution of the instruction or not is judged (step 601), When the change of the key value is detected (step 601 NO), whether the instruction executed in conjunction with the change is an entry gate ("egate") instruction or not is checked next (step S602). If it is the entry gate instruction, it implies that it is a proper instruction so that the control can be shifted to the changed code. Consequently, when it is judged as an entry gate instruction (step 602 YES), this instruction is executed.

On the other hand, when it is judged as not an entry gate instruction (step 602 NO), it implies that the interrupted instruction is an improper instruction. In this case, whether the instruction that was executed immediately previously is an encrypted (protected) instruction or not is judged (step 603). If it is a non-protected instruction, the exception processing can take place directly, but if it is a protected instruction, there is a need to carry out the exception processing while protecting that instruction.

Consequently, when it is judged as a non-protected instruction (step 603 NO), the exception processing is carried out directly, whereas when it is judged as a protected instruction (step 6003 YES), the non-restartable exception processing is carried out while maintaining the protected state.

By this limitation of the control shifting, the direct shifting of the control from a plaintext code to a code at a location other than that of the entry gate instruction is prohibited. The context recovery implies the recovery of the state that was already executed once by that program through the entry gate. Consequently, the execution of the protected program must pass through the entry gate. By suppressing locations for placing the entry gate to the minimum necessary number in the program, there is an effect of preventing an attack for guessing a program structure by executing the program from various addresses.

Also, at this entry gate, the initialization of the data protection attribute registers is carried out. When the entry gate is executed, a random number Kr is loaded into a key region (a region 717-5 in CY3) of the data protection attribute registers CY0 to CY3 717 to 720 shown in FIG. 9 The encryption target top address is set to "0", the size is set to an upper limit of the memory, and the entire logical address space is set as the encryption target. If the debug attribute is not set in the execution code, the debug bit (717-3 in CY3) is set as non-debugging.

In other words, at a timing of the encryption code execution start, all the memory accesses are encrypted by using the random number Kr determined at a time of the entry gate execution. Also, in the execution code encryption control, the definition in the page table is given a higher priority as already mentioned above. This random number Kr is generated independently from the random number used in the context encryption.

By this mechanism, a protected program to be newly executed is set to be always encrypted by using a key determined randomly at a time of the start of all the memory accesses.

Of course, in this state the entire memory region is encrypted so that it is impossible to give parameters of the system call through the memory or exchange data with the other programs. For this reason, the program carries out the processing by sequentially adjusting its own processing environment by setting the data protection attribute registers such that the necessary memory region can be converted into plaintext so that it becomes accessible. By leaving the register CY3 with a lowest priority in the initial setting of being encrypted by using the random number, while setting the encryption key "0" as the plaintext access setting for the other registers, it is possible to reduce a risk of accessing an unnecessary region as a plaintext and writing data to be kept in secret by encryption out to a plaintext region by error.

The contents of the registers other than the data protection attribute registers are not encrypted even in the initialization at the entry gate, and pointers for specifying locations of stacks or parameters can be stored therein. However, cares should be taken in the processing of the program to be executed through the entry gate so that secrets of the program will not be stolen by calling up the entry gate by setting illegal values into the registers.

It is also possible to use a configuration for initializing all the registers other than the flags and the program counter, including the general purpose registers other than the data protection attribute registers, at the entry gate in the case of attaching more importance to the safety, even though this provision makes the programming more restricted and the efficiency poorer. Even in this case, the parameters such as stacks can be exchanged through a memory region specified by a relative address or an absolute address of the program counter. Note however that, similarly as in the case of the context saving, the system registers including a part of the flag registers and the task register are excluded from a target of the encryption or the initialization of the registers for the sake of continuation of the OS operation.

In this way, in the microprocessor 101 of this embodiment, the fragmental execution of the protected code, especially the illegal setting of the data protection state, is prevented, as the first instruction to be executed at a time of shifting the control from the program in the plaintext state to the protected program is limited to the entry gate instruction and the registers including the data protection attribute registers are initialized by the execution of the entry gate instruction.

Figure 13:
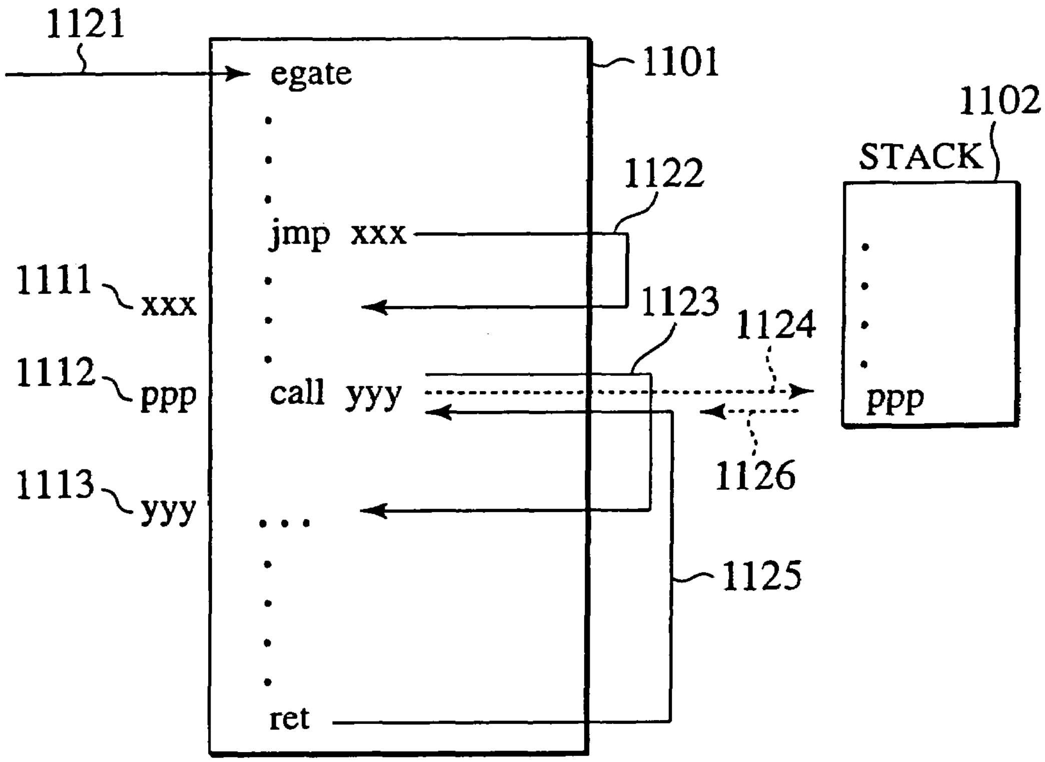
FIG. 13 is a diagram conceptually showing a process of execution control within a protection domain by the microprocessor of FIG. 3.

Next, the execution control of the protected program will be described. First, the call up and the branching that are closed within the protection domain will be described, The call up within the protection domain is exactly the same as that for the usual programs. FIG. 13 shows the call up and the branching within the protection domain conceptually.

The execution of the code 1101 in the protection domain is started as a thread 1121 outside the protection domain is branched into an "egate" (entry gate) instruction of the protection domain. By the execution of the "egate" instruction, all the registers are initialized, and then the data protection attributes are set up sequentially by the execution of the program. The control is shifted to a branch target "xxx" 1111 in the protection domain by a "jmp xxx" instruction (processing 1122), and a "call yyy" instruction located at an address "ppp" 1112 is executed (processing 1123). The calling source address "ppp" 1112 is pushed into a stack memory 1102, and the control is shifted to a call target "yyy" 1113. When the processing at the call target is completed and a "ret" instruction is executed, the control is shifted to a return address "ppp" 1112 in the stack. There is no limitation on the execution control while the execution code encryption key remains the same.

Next, the call up and the branching from a protection domain to a non-protection domain will be described. For this control shifting, the execution of a special instruction and the operation of the user TSS to be described below will be carried out in order to avoid a shifting from a protection domain to a non-protection domain that is not intended by the program creator and to protect the data protection state.

Figure 14:
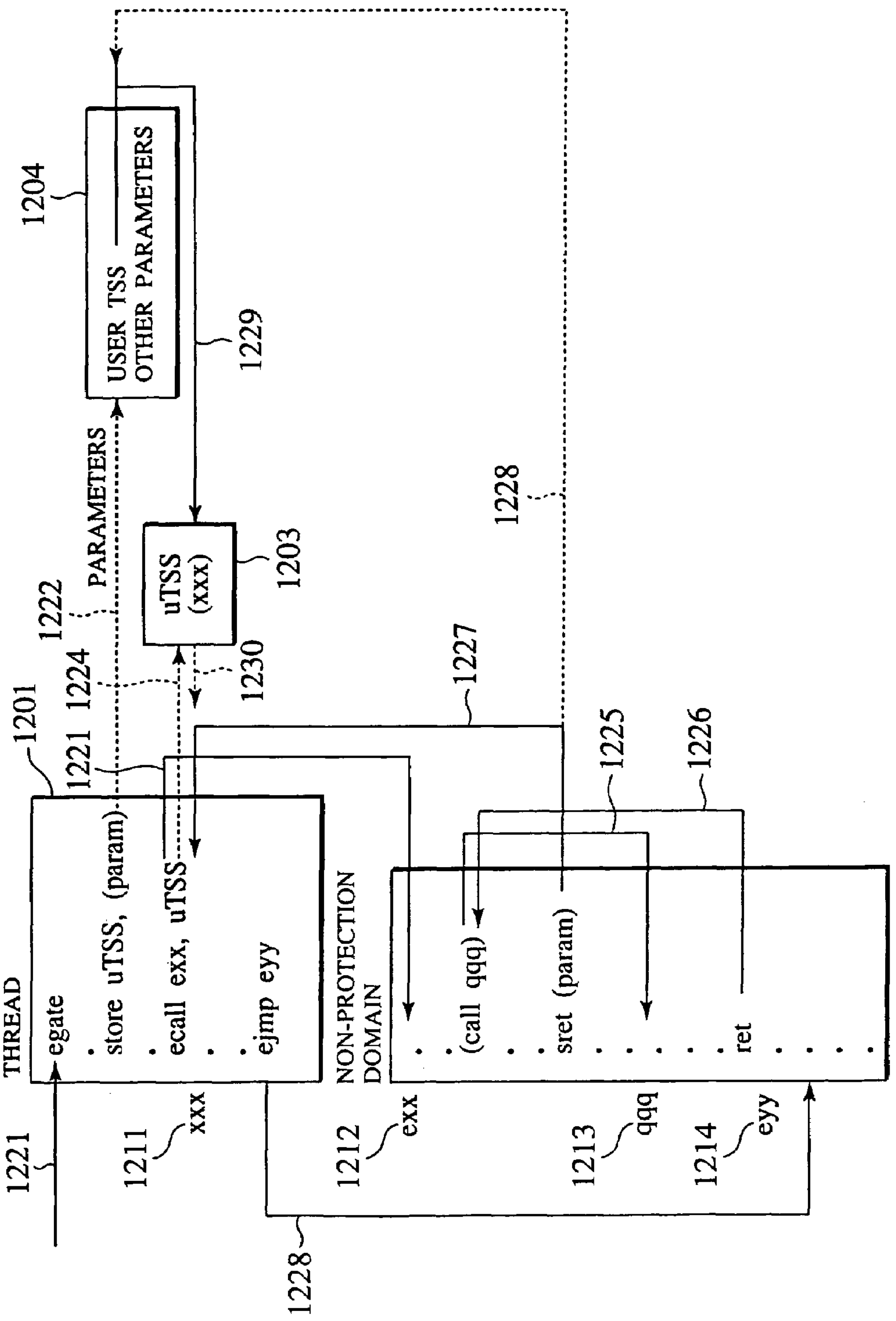
FIG. 14 is a diagram conceptually showing a process of call up and branching from a protection domain to a non-protection domain by the microprocessor of FIG. 3.
Figure 15:
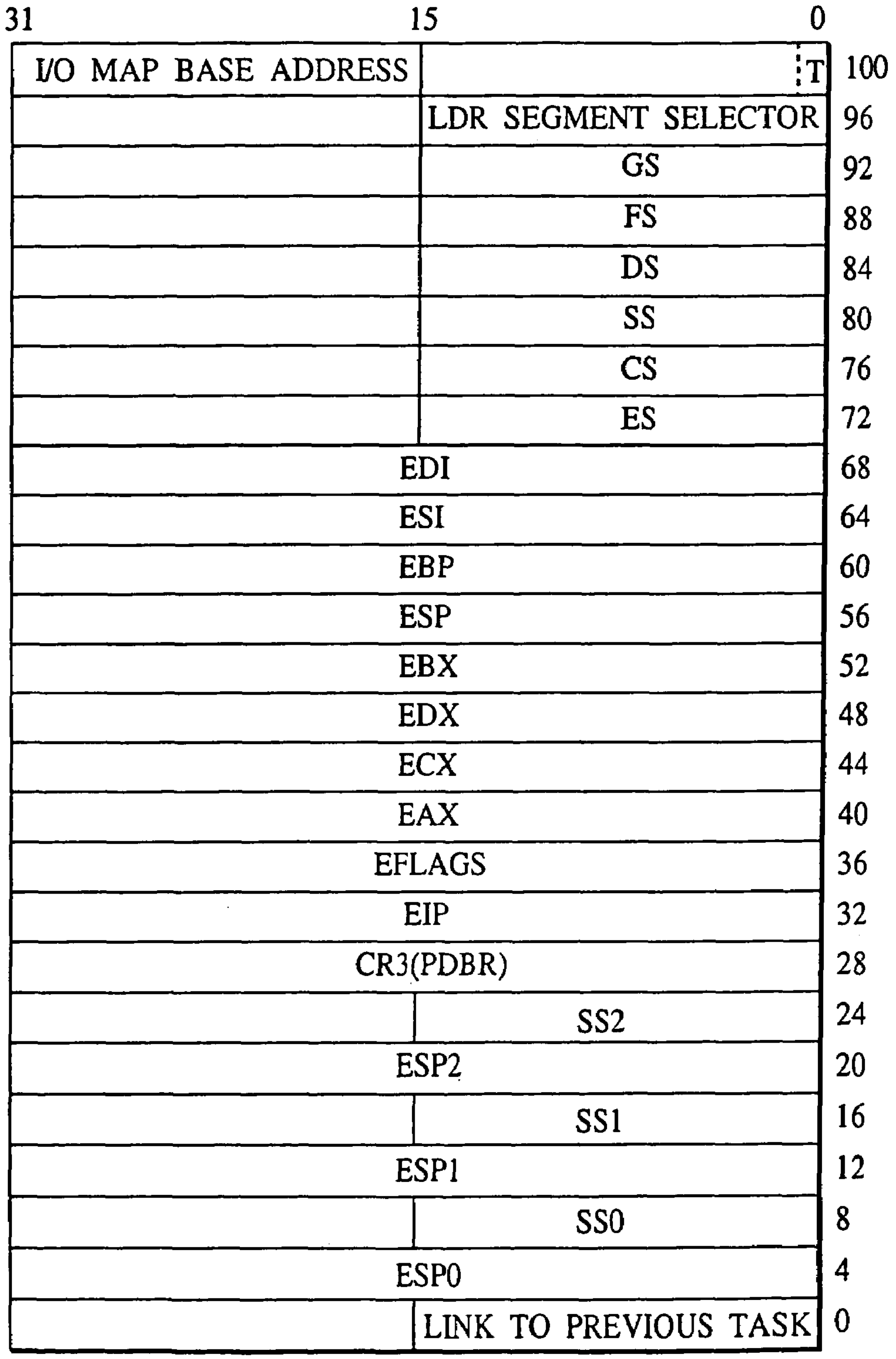
FIG. 15 is a diagram showing a context saving format used in a conventional processor.

FIG. 14 shows the call up and the branching from a protection domain to a non-protected domain conceptually, where an execution code 1201 of the protection domain and an execution code 1202 of the non-protection domain are placed in respective domains. Also, a user TSS region 1203 and a region 1204 for exchanging parameters with the non-protection domain are provided.

The execution begins when a thread 1221 executes the "egate" instruction. The program of the protection domain saves the address of the user TSS region 1203 in a prescribed parameter region 1204 before calling up the code of the non-protection domain. Then, the code of the non-protection domain is called up by executing the "ecall" instruction. The "ecall" instruction takes two operands. One is a call target address, and the other is a saving target of the execution state. The "ecall" instruction saves the register state at a time of the call up (or more accurately the register state when the program counter is in a state after the "ecall" instruction is issued) into a region specified by the operand "uTSS", in a format similar to that in the case of the encrypted TSS described above. In the following, this region will be referred to as a user TSS.

The difference between the user TSS and the system TSS lies in that, in the user register shown in FIG. 10, a U flag is set in a region 825-2 on the TSS. The difference in the operation will be described later. In the saving of the user TSS into the memory, the data protection attributes defined in the data protection attribute registers CY0 to CY3 by the user are not applied, similarly as in the case of the saving of the context information into the system TSS.

The call target code of the non-protection domain cannot exchange parameters because the registers are initialized by the execution of the "ecall" instruction. For this reason, the parameters are acquired from a prescribed address "param" 1204, and the necessary processing is carried out. There is no limitation on the programming in the non-protection domain. In the example of FIG. 14, a sub-routine "qqq" 1213 is called up (processing 1225). The call up from the protection domain can be adapted to the call up semantics of the sub-routine "qqq" by placing an adaptor code for copying stack pointer setting and the parameters to the stack, between "exx" and the call up of "qqq", for example. The processing result is sent to the calling source through the parameter region 1204 on the memory (processing 1226). When the processing of the sub-routine is completed, a "sret" instruction is issued in order to return the control to the calling source protection domain (processing 1227).

The "sret" instruction takes one operand for specifying the user TSS, unlike the "ret" instruction that has no operand. Here, the user TSS 1203 is specified indirectly as the recovery information through a pointer stored in the parameter region "param" 1204. The recovery of the user TSS by the "sret" instruction largely differs from the recovery of the system TSS in that the task register is not affected at all even when the user TSS is recovered. The task link field of the user TSS will be ignored. The recovery will fail when the system TSS with the U flag 825-2 set to "0" is specified in the operand of the "sret" instruction.

At a time of the execution of the recovery, the decryption of the execution state and the verification of the execution code encryption key and the signature already described above are carried out, and when the violation is detected, the exception of the secret protection violation will occur. When the verification succeeds, the execution is restarted from an instruction next to the calling source "ecall" instruction. This address is encrypted and signed in the user TSS, so that it is cryptographically impossible to forge this address. All the registers except for the program counter will be set back to the state before the call up, so that the code of the protection domain acquires the execution result of the sub-routine "exx" from the parameter region 1204.

At a time of shifting the control to the non-protection domain after the processing of the protection domain is completed, an "ejmp" instruction is used. The "ejmp" instruction does not carry out the saving of the state, unlike the "ecall" instruction. If the control is shifted from the protection domain to the non-protection domain by the instruction other than "ecall" and "ejmp", such as "jmp" or "call", the exception of the secret protection violation occurs and the encrypted context information is saved in the TSS region (a region indicated by the task register) of the system. Note that the context information will be marked as non-restartable at this point. Note also that specifying an address in the protection domain as a jumping target of the "ejmp" instruction does not cause the violation.

This completes the description of a procedure for call up from the protection domain to the non-protection domain and newly added instructions used in that procedure.

At a time of the recovery of the user TSS by the application, an attack for substituting the user TSS by the OS which has privileges is not entirely impossible. However, the interchangeable TSS information in such a case is only the context information whose execution is always started through the "egate" and which is saved by the saving of the execution state caused by the interruption or by the user explicitly, as long as the execution code encryption key of the protection domain is managed correctly. A possibility for the leakage of the secrets of the application due to the interchange of this context information is quite small, and it is quite difficult for an attacker to guess what kind of the context information interchange is necessary in acquiring the secrets of the application.

The procedure for call up from the protection domain to the non-protection domain described above is also applicable to a procedure for shifting the control between the protection domains, if the instruction to be executed first at the call target is the "egate" instruction of the calling source side.

In this case, the call up between the protection domains can be carried out safely by encrypting the region for exchanging parameters between these protection domains, by using an encryption key that is shared by carrying out the authentication key exchange between these protection domains in advance.

As described, according to the microprocessor of the present invention, it becomes possible to prevent the illegal analysis by the OS or a third party by protecting both the execution codes and the processing target data of the execution codes by using the encryption, under the multi-task environment.

Also, it becomes possible to prevent the illegal rewriting of the encryption at tributes in the case of saving the encrypted data.

Also, it becomes possible to protect the encrypted data from illegal attacks by using arbitrary random number Kr rather than a fixed key as the encryption key for the processing target data.

Also, it becomes possible to carry out the debugging in the plaintext state, and when errors are found, a feedback on the errors can be provided to the program vendor who knows the execution code encryption key.

Also, it becomes possible to prevent an increase of the memories in the microprocessor and suppress the cost of the microprocessor by saving information that required the secret protection such as the encryption attribute information on an external memory by attaching a signature of the microprocessor, reading only the necessary portion into the registers inside the microprocessor, and carrying out the verification of the signature at a time of reading. In this scheme, the safety against the substitution at a time of the reading can also be guaranteed.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A microprocessor having a unique secret key and a unique public key corresponding to the unique secret key that cannot be read out to external, comprising:

a reading unit configured to read out a plurality of programs encrypted by using different execution code encryption keys from an external memory;

a decryption unit configured to decrypt the plurality of programs read out by the reading unit by using respective decryption keys;

an execution unit configured to execute the plurality of programs decrypted by the decryption unit;

a context information saving unit configured to save a context information for one program whose execution is to be interrupted, into a context information memory provided inside the microprocessor, or encrypt the context information by using the public key and save the encrypted context information into the external memory, the context information containing information indicating an execution state of the one program and the execution code encryption key by which the one program was encrypted when the one program was read out by the reading unit; and a restart unit configured to restart an execution of the one program by reading out the context information from the context information memory, and recovering the execution state of the one program by using the context information including the execution code encryption key, or reading out the encrypted context information from the external memory, decrypting the encrypted context information by using the secret key, and recovering the execution state of the one program from the decrypted context information, wherein the restart unit restarts the execution of the one program only when a decrypted execution code encryption key contained in the decrypted context information coincides with the execution code encryption key of the one program.

2. The microprocessor of claim 1, wherein the restart unit uses a decrypted execution code encryption key contained in the decrypted context information as a decryption key for decrypting the one program.

3. The microprocessor of claim 1, wherein the context information saving unit is configured to save the context information in a plaintext form into the context information memory which is not readable by another program which is executed after the one program is interrupted; and the restart unit is configured to restart an execution of the one program by reading out the context information from the context information memory, and recovering the execution state of the one program from the context information.

4. The microprocessor of claim 3, wherein the restart unit restarts the execution of the one program in response to an execution of a prescribed instruction by the another program.

5. The microprocessor of claim 4, wherein the context information saving unit saves the context information into the context information memory at a time of interrupting the execution of the one program, and encrypts the context information in the context information memory by using the public key and stores the encrypted context information into the external memory in response to an execution of another prescribed instruction by the another program.

6. The microprocessor of claim 3, wherein the context information saving unit saves the context information into the context information memory at a time of interrupting the execution of the one program, and encrypts the context information in the context information memory by using the public key and stores the encrypted context information into an address on the external memory that is specified by the another program.

7. The microprocessor of claim 1, further comprising:

an execution state memory unit for storing an execution state of a currently executed program; and an execution state initialization unit configured to initialize a content of the execution state memory unit to a prescribed value or encrypts the content of the execution state memory unit, before an execution of another program starts after the one program is interrupted.

8. The microprocessor of claim 1, further comprising:

a key reading unit configured to read out the execution code encryption key of each program that is encrypted by using the public key in advance, from the external memory; and a key decryption unit configured to decrypt the execution code encryption key read out by the key reading unit, by using the secret key;

wherein the decryption unit decrypts each program by using the execution code encryption key as a decryption key.

9. The microprocessor of claim 1, further comprising:

an execution state memory unit for storing an execution state of a currently executed program and an encryption attributes for data to be processed by the currently executed program; and a data encryption unit configured to encrypt the data to be processed by the currently executed program according to the encryption attributes stored in the execution state memory unit.

10. The microprocessor of claim 1, further comprising:

an execution state memory unit for storing an execution state of a currently executed program, encryption attributes for data to be processed by the currently executed program, and an encryption attribute specifying information for specifying the encryption attributes;

a related information writing unit configured to write a related information related to the encryption attribute specifying information and containing a signature obtained by using the secret key, into the external memory;

a related information reading unit configured to read out the related information from the external memory according to an address of a data to be referred by the currently executed program;

a data referring permission unit configured to verify the signature contained in the related information by using the public key, and to permit a data referring by the currently executed program by determining an encryption key and an algorithm to be used for the data referring according to the related information and the encryption attribute specifying information, only when the signature contained in the related information coincides with an original signature of the microprocessor; and a data encryption unit configured to encrypt the data to be referred by the currently executed program according to the encryption attributes stored in the execution state memory unit.

11. The microprocessor of claim 1, further comprising:

a cache memory for caching plaintext instructions and plaintext data for the plurality of programs in units of cache lines, the cache memory having an attribute area for each cache line indicating a decryption key identifier for uniquely identifying a decryption key used in decrypting each program whose instructions are cached in each cache line or each program whose execution has caused caching of the plaintext data in each cache line; and a cache access control unit configured to permit a data referring caused by an execution of one cached program stored in one cache line with respect to one cached data in another cache line, only when the decryption key identifier indicated by the encryption attribute for the one cache line coincides with the decryption key identifier indicated by the encryption attribute for the another cache line.

12. The microprocessor of claim 11, wherein when the data referring is not permitted, new data are cached into the another cache line from the external memory.

13. The microprocessor of claim 11, wherein when the data referring is not permitted, an execution of the one cached program is interrupted by a protection exception.

14. The microprocessor of claim 1, wherein the execution unit also executes plaintext programs, and has a debugging function for causing an exception when an execution of a program at a specific address or address region or a data referring to a data at the specific address or address region occurs during an execution of a plaintext program, the debugging function being invalidated during an execution of an encrypted program.

15. The microprocessor of claim 1, wherein constituent elements of the microprocessor are contained in a single chip or a single package.

16. A microprocessor having a unique secret key and unique public key corresponding to the unique secret key that cannot be read out to external, comprising:

a reading unit configured to read out a plurality of programs encrypted by using different execution code encryption keys from an external memory;

a decryption unit configured to decrypt the plurality of programs read out by the reading unit by using respective decryption keys;

an execution unit configured to execute the plurality of programs decrypted by the decryption unit;

a context information saving unit configured to save a context information for one program whose execution is to be interrupted, into the external memory or a context information memory provided inside the microprocessor, the context information containing information indicating an execution state of the one program and the execution code encryption key of the one program; and a restart unit configured to restart an execution of the one program by reading out the context information from the external memory or the context information memory, and recovering the execution state of the one program from the context information, wherein the context information saving unit is configured to generate a random number as a temporary key, to encrypt the context information, and to save an encrypted context information into the external memory, the encrypted context information containing a first value obtained by encrypting information indicating the execution state of the one program by using the temporary key and a second value obtained by encrypting the temporary key by using the public key; and the restart unit is configured to restart the execution of the one program by reading out the encrypted context information from the external memory, decrypting the temporary key from the second value contained in the encrypted context information by using the secret key, decrypting the information indicating the execution state from the first value contained in the encrypted context information by using a decrypted temporary key, and recovering the execution state of the one program from a decrypted context information.

* * * * *